United States Patent
Archer et al.

(10) Patent No.: US 9,882,199 B2
(45) Date of Patent: Jan. 30, 2018

(54) SULFUR CONTAINING NANOPOROUS MATERIALS, NANOPARTICLES, METHODS AND APPLICATIONS

(75) Inventors: Lynden A. Archer, Ithaca, NY (US); Jayaprakash Navaneedhakrishnan, Lexington, KY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 13/884,314

(22) PCT Filed: Nov. 8, 2011

(86) PCT No.: PCT/US2011/059722
§ 371 (c)(1),
(2), (4) Date: Aug. 20, 2013

(87) PCT Pub. No.: WO2012/064702
PCT Pub. Date: May 18, 2012

(65) Prior Publication Data
US 2013/0330619 A1 Dec. 12, 2013

Related U.S. Application Data

(60) Provisional application No. 61/411,645, filed on Nov. 9, 2010.

(51) Int. Cl.
*H01M 4/133* (2010.01)
*H01M 4/13* (2010.01)
(Continued)

(52) U.S. Cl.
CPC .......... *H01M 4/13* (2013.01); *H01M 4/0416* (2013.01); *H01M 4/136* (2013.01); *H01M 4/137* (2013.01);
(Continued)

(58) Field of Classification Search
CPC .......................... H01M 4/133; H01M 10/052
(Continued)

(56) References Cited

U.S. PATENT DOCUMENTS 6,030,720 A 2/2000 Chu et al.
6,194,099 B1 2/2001 Gernov et al.
(Continued)

FOREIGN PATENT DOCUMENTS

JP 2009196843 A 9/2009
KR 102003013553 A 2/2003
(Continued)

OTHER PUBLICATIONS

Sun et al. (Electrochemistry Communications 10 (2008) 1819-1822).*
(Continued)

*Primary Examiner* — Olatunji Godo
(74) *Attorney, Agent, or Firm* — Hodgson Russ LLP

(57) ABSTRACT

Sulfur containing nanoparticles that may be used within cathode electrodes within lithium ion batteries include in a first instance porous carbon shape materials (i.e., either nanoparticle shapes or "bulk" shapes that are subsequently ground to nanoparticle shapes) that are infused with a sulfur material. A synthetic route to these carbon and sulfur containing nanoparticles may use a template nanoparticle to form a hollow carbon shape shell, and subsequent dissolution of the template nanoparticle prior to infusion of the hollow carbon shape shell with a sulfur material. Sulfur infusion into other porous carbon shapes that are not hollow is also contemplated. A second type of sulfur containing nanoparticle includes a metal oxide material core upon which is located a shell layer that includes a vulcanized polymultiene polymer material and ion conducting polymer material. The foregoing sulfur containing nanoparticle mate-
(Continued)

rials provide the electrodes and lithium ion batteries with enhanced performance.

21 Claims, 21 Drawing Sheets

(51) Int. Cl.
  *H01M 4/136* (2010.01)
  *H01M 4/1397* (2010.01)
  *H01M 4/66* (2006.01)
  *H01M 10/052* (2010.01)
  *H01M 10/39* (2006.01)
  *H01M 4/04* (2006.01)
  *H01M 4/137* (2010.01)
  *H01M 4/139* (2010.01)
  *H01M 4/1399* (2010.01)

(52) U.S. Cl.
  CPC ......... *H01M 4/139* (2013.01); *H01M 4/1397* (2013.01); *H01M 4/1399* (2013.01); *H01M 4/663* (2013.01); *H01M 4/664* (2013.01); *H01M 10/052* (2013.01); *H01M 10/39* (2013.01); *H01M 10/3909* (2013.01)

(58) Field of Classification Search
  USPC .......................................... 429/213
  See application file for complete search history.

(56) References Cited

U.S. PATENT DOCUMENTS

| 6,210,831 | B1 | 4/2001 | Gorkovenko et al. |
|---|---|---|---|
| 2003/0049529 | A1 | 3/2003 | Cho et al. |
| 2004/0048154 | A1 | 3/2004 | Jung et al. |
| 2005/0032635 | A1* | 2/2005 | Yu .................. B82Y 30/00 502/180 |
| 2005/0042503 | A1 | 2/2005 | Kim et al. |
| 2005/0095504 | A1 | 5/2005 | Kim et al. |
| 2006/0115579 | A1 | 6/2006 | Mukherjee et al. |
| 2007/0237990 | A1 | 10/2007 | Kim |
| 2011/0076560 | A1 | 3/2011 | Scordilis-Kelley et al. |
| 2011/0082024 | A1 | 4/2011 | Liu et al. |
| 2011/0104553 | A1 | 5/2011 | Pol et al. |

FOREIGN PATENT DOCUMENTS

| WO | 2009040553 A2 | 4/2009 |
|---|---|---|
| WO | WO2009114314 * | 9/2009 |

OTHER PUBLICATIONS

Han et al. (Journal of The Electrochemical Society, 150 (7) A889-A893 (2003)).*
Ji et al. (Nature Materials vol. 8, Jun. 2009 p. 500-506).*
Yu et al. (Journal of Electroanalytical Chemistry 573 (2004) 121-128).*
Ji et al. (Nature Materials vol. 8, Jun. 2009 p. 500-506) Supplemetary Information.*
Yang et al. (Chem. Mater. 2008, 20, 2049-2056).*
Ji et al. (Chem. Commun., 2006, 1206-1208).*
Fang et al. (Langmuir 2008, 24, 12068-12072).*
J.L. Wang et al.; Sulfur—carbon nano-composite as cathode for rechargeable lithium battery based on gel electrolyte; Electrochemistry Communications 4 (2002) 499-502; 2002 Elsevier Science B.V.
T. H. Meltzer; Fraction of effective sulfur crosslinking in polybutadiene rubber vulcanizates; Journal of Applied Polymer Science; vol. 9, Issue 9, pp. 3041-3048, Sep. 1965, 1965 John Wiley & Sons, Inc.
Amit A. Deshmukh et al.; Carbon spheres; Materials Science and Engineering R 70 (2010) 1-28; 2010 Elsevier B.V.
Motohiro Nagao et al.; Sulfur—carbon composite electrode for all-solid-state Li/S battery with Li2S—P2S5 solid electrolyte; Electrochimica Acta 56 (2011) 6055—6059; 2011 Elsevier Ltd.

* cited by examiner

SULFUR CONTAINING NANOPOROUS MATERIALS, NANOPARTICLES, METHODS AND APPLICATIONS

CROSS-REFERENCE TO RELATED APPLICATION

This application is related to, and derives priority from, U.S. Provisional Patent Application Ser. No. 61/411,645, filed 9 Nov. 2010 and titled Nanocomposite for Lithium Battery—Apparatus, Method and Applications, the content of which is incorporated herein fully by reference.

STATEMENT REGARDING FEDERALLY SPONSORED RESEARCH

This invention was made with government support under contract no. DE-SC0001086awarded by the Department of Energy. The government has certain rights in the invention.

BACKGROUND

Field of the Invention

Embodiments relate generally to sulfur containing nanoporous materials and nanoparticles. More particularly, embodiments relate to sulfur containing nanoporous materials, nanoparticles, methods and applications.

Description of the Related Art

Among cathode materials for secondary lithium batteries, elemental sulfur has a very high theoretical capacity, 1672 mAhg$^{-1}$ against lithium, which is considerably greater than that of many commercially used transition metal phosphates and transition metal oxides. In addition, elemental sulfur also provides several other advantages as a cathode material for a secondary lithium battery, including in particular a low cost and a widespread availability. Sulfur has consequently been studied extensively as a cathode material for secondary lithium batteries and is considered a promising candidate for a cathode material for secondary lithium batteries that may be used in electric and hybrid electric vehicles.

Despite this promise, implementation of Li—S secondary battery systems for high power applications has been problematic for various reasons. Thus, desirable are methods and materials that provide an opportunity to more fully realize the advantages of sulfur as a cathode material within a Li—S secondary battery system.

SUMMARY

Embodiments provide sulfur containing nanoporous materials and nanoparticles, and methods for fabricating the sulfur containing nanoporous materials and nanoparticles. The sulfur containing nanoporous materials and nanoparticles in accordance with the embodiments may be used as active materials (or a source of active materials) within a cathode within a lithium ion battery to provide a lithium-sulfur secondary battery system with enhanced performance and properties. In addition to the sulfur containing nanoporous materials and nanoparticles and methods for fabricating the sulfur containing nanoporous materials and nanoparticles in accordance with the embodiments, the resulting cathodes and the resulting lithium ion batteries that incorporate the sulfur containing nanoparticles are also included within the embodiments.

A nanoparticle in accordance with one particular embodiment provides a sulfur material infused carbon material shape nanoparticle (i.e., typically a hollow sphere) that may be fabricated using a pyrolysis of a carbon precursor material upon a template nanoparticle, followed by dissolution of the template nanoparticle and infusion of the remaining hollow carbon material shape with a sulfur material. These particular nanoparticles provide when incorporated as an active material into a cathode for use within a lithium-sulfur electrochemical cell a cyclic voltammogram that shows a stable two step oxidation process and a stable two step reduction process (i.e., the stable two step oxidation process and the stable two step reduction process are intended to exhibit no appreciable voltage shifts (i.e., less than about 0.2 volts) or peak height variation (i.e., less than about 20% variation) with repetitive battery charge cycling and discharge cycling of up to at least about 100 cycles.

A nanoporous material in accordance with the foregoing particular nanoparticle related embodiment may also include a larger "bulk" (i.e., at least millimeter sized, and generally even at least centimeter sized and larger than centimeter sized) nanoporous carbon material shape that is similarly infused with sulfur. This larger "bulk" sulfur material infused nanoporous carbon material shape may be ground into nanoparticles that provide when incorporated as an active material into a cathode for use within a lithium-sulfur electrochemical cell the cyclic voltammogram that shows the stable two step oxidation process and the stable two step reduction process, as above. Thus, this particular first embodiment contemplates that properly sized carbon material shape nanoparticles may be first formed and then infused with a desirable sulfur material. This particular first embodiment also contemplates that a larger "bulk" nanoporous carbon material shape may first be infused with the desirable sulfur material and then ground into the desired end product sulfur infused carbon material shape nanoparticles.

Another particular embodiment provides a metal oxide core nanoparticle to which is bonded a vulcanized polymultiene polymer material and ion conducting polymer material shell. When incorporated as an active material into a cathode for use within a lithium-sulfur electrochemical cell, these particular nanoparticles also show enhanced electrochemical performance within the context of charge and discharge cycling of the lithium-sulfur electrochemical cell.

A particular nanoparticle in accordance with the embodiments includes a carbon material support. The particular nanoparticle also includes a sulfur material supported on the carbon material support. A cyclic voltammogram of a lithium-sulfur cell that includes the nanoparticle as an active material within a cathode shows a stable reduction peak at about 2.4 volts.

A particular nanoporous material in accordance with the embodiments includes a bulk carbon material support. This particular nanoporous material in accordance with the embodiments also includes a sulfur material supported on the bulk carbon material support. A cyclic voltammogram of a lithium-sulfur cell that includes a nanoparticle derived from the nanoporous material within a cathode shows a stable reduction peak at about 2.4 volts.

A particular method for fabricating the particular foregoing nanoparticle in accordance with the embodiments includes infusing at a temperature of at least about 450 degrees Celsius and a vapor pressure of at least about 2 atmospheres into a porous carbon material support a sulfur material source to provide a sulfur infused porous carbon material support.

Another particular method for fabricating a nanoparticle in accordance with the embodiments includes infusing at a temperature at least about 450 degrees Celsius and a pressure at least about 2 atmospheres a bulk porous carbon material support with a sulfur material source to provide a sulfur infused bulk porous carbon material support. This other particular method also includes grinding the sulfur infused bulk porous carbon material support to form the nanoparticle.

Another particular nanoparticle in accordance with the embodiments includes a core comprising a metal oxide material. This other particular nanoparticle also includes a shell layer located encapsulating the core and comprising a sulfur cross-linked polymultiene polymer material coupled with an ion conducting polymer material.

Another method for fabricating this other particular nanoparticle in accordance with the embodiments includes forming an organofunctional metal oxide core. This other method also includes reacting the organofunctional metal oxide core with one of a multifunctional polymultiene polymer material and a multifunctional ion conducting polymer material to form a partially sheathed metal oxide core. This other method also includes reacting the partially sheathed metal oxide core with a complementary one of a functional polymultiene polymer material and a functional ion conducting polymer material to form a polymultiene polymer material and ion conducting polymer material shell bonded to the organofunctional metal oxide core. This other method also includes vulcanizing the polymultiene polymer material with a sulfur material.

BRIEF DESCRIPTION OF THE DRAWINGS

The objects, features and advantages of the embodiments are understood within the context of the Detailed Description of the Embodiments, as set forth below. The Detailed Description of the Embodiments is understood within the context of the accompanying drawings, that form a material part of this disclosure, wherein.

DETAILED DESCRIPTION OF THE EMBODIMENTS

Figure 1A:
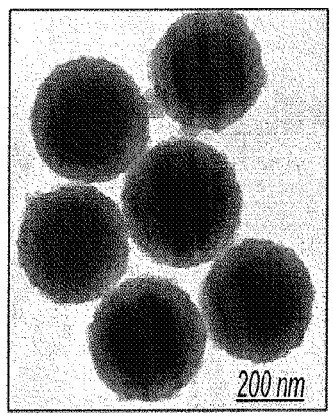
FIG. 1 shows transmission electron microscopy images of high surface area silica template nanoparticles (FIG. 1a) and carbon coated high surface area silica template nanoparticles (FIG. 1b) in accordance with a first embodiment.

Embodiments provide a plurality of sulfur containing nanoporous materials and nanoparticles that may be used within a cathode within a lithium ion battery, as well as a corresponding plurality of methods that may be used for fabricating the plurality of sulfur containing nanoporous materials and nanoparticles that may be used within the cathode within the lithium ion battery. The cathode and the lithium ion battery that use the sulfur containing nanoparticles are also included within the embodiments.

In accordance with one particular embodiment, the sulfur containing nanoporous materials and nanoparticles comprise a sulfur material infused carbon material shape nanoparticle. (i.e., such as but not limited to a sphere or other hollow capsule shape, or alternatively a non-hollow shape). The sulfur material (i.e., typically elemental sulfur) is infused into the carbon material shape to provide a sulfur infused carbon nanoporous material shape or nanoparticle at a temperature at least about 450 degrees Celsius and at comparatively high pressure of at least about 2 atmospheres.

In accordance with another particular embodiment, the sulfur containing nanoparticles comprise a metal oxide core to which is bonded a shell that comprises a vulcanized polymultiene polymer material (i.e., typically but not limited to a polybutadiene polymer material) and ion conducting polymer material (i.e., typically but not limited to a polyethyleneglycol polymer material). This other particular sulfur containing nanoparticle typically comprises: (1) a metal oxide material content from about 2 to about 20 weight percent; (2) a polymultiene polymer material content from about 10 to about 40 weight percent; (3) an ion conducting polymer material content from about 2 to about 5 weight percent; and (4) a sulfur material content from about 2 to about 80 weight percent.

Each of the foregoing two particular embodiments is described individually in greater detail below.

I. Sulfur Containing Nanoparticle Comprising Sulfur Material Infused Hollow Carbon Material Shape Nanoparticles This particular first embodiment includes a facile and scalable method for synthesizing mesoporous hollow carbon material shapes (i.e., capsules such as but not limited to spheres) that encapsulate and sequester a sulfur material (and in particular an elemental sulfur material) in their interiors, and also within their porous shells. The interior void space, the mesoporous shell structure, a chemical make-up of the shell and a methodology used to infuse sulfur into the carbon material shapes are designed with four specific goals under consideration. The four specific goals include: (i) an intent to maximize an amount of sulfur material sequestered by the carbon materials capsules; (ii) an intent to minimize lithium polysulfide dissolution and shuttling in an electrolyte; (iii) an intent to preserve fast transport of lithium ions to the sequestered sulfur by ensuring good electrolyte penetration; and (iv) an intent to facilitate good transport of electrons from the poorly conducting sulfur, under circumstances where the hollow carbon material shapes infused with the sulfur material are incorporated into a cathode material in a Li—S secondary battery. As discussed in greater detail below, the as prepared S@C carbon-sulfur nanocomposite shapes were found to manifest promising electrochemical behavior upon extended cycling for 100 cycles at 850 mA/g (0.5 C), consistent with desirable goals in designing the hollow carbon material shapes. The electrochemical stability of the S@C composites was confirmed using extended scan cyclic voltammetry measurements.

Figure 1B:
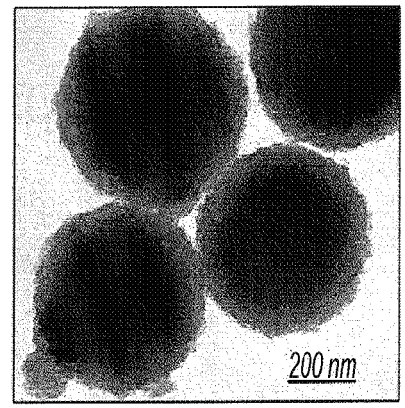
Figure 3A:
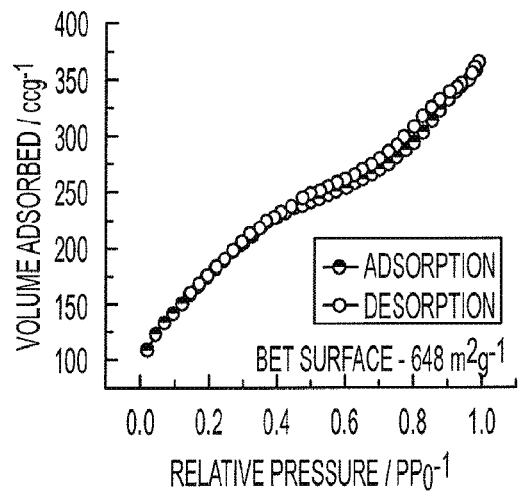
FIG. 3 shows a nitrogen sorption isotherm (FIG. 3a) and pore size distribution graph (FIG. 3b) of the high surface area hollow carbon spheres in accordance with the first embodiment.
Figure 3B:
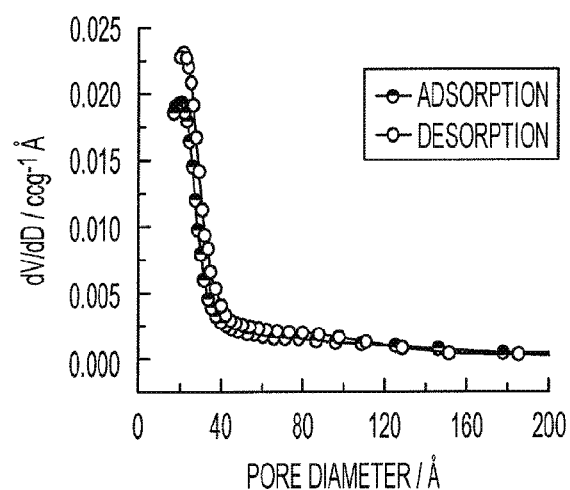
Figure 4:
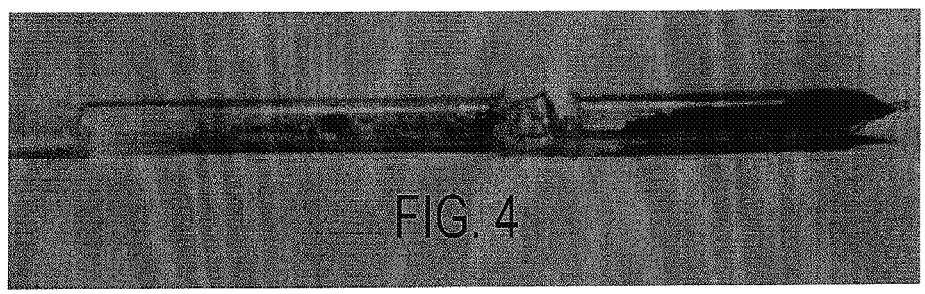
FIG. 4 shows an image of a custom fabricated segmented glass tube used for vapor phase infusion of sulfur into the high surface area hollow carbon spheres in accordance with the first embodiment.
Figure 5:
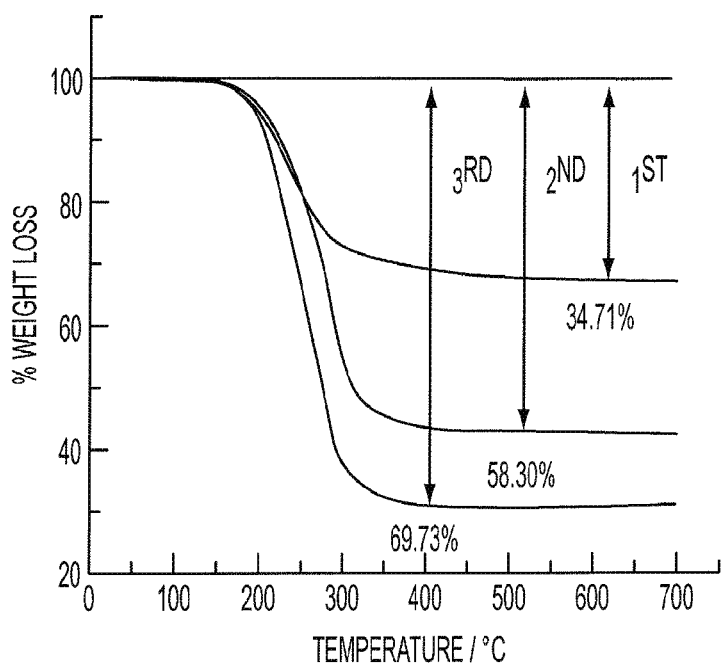
FIG. 5 shows a thermal gravimetric analysis (TGA) graph for sulfur infused high surface area hollow carbon spheres in accordance with the first embodiment.

In a first step of the synthesis of the S@C composites, carbon spheres were fabricated by pyrolysis of a low-cost carbon precursor material (e.g., pitch material, although as discussed further below other carbon precursor materials are not precluded) uniformly deposited onto and into the pores of porous metal oxide template nanoparticles (see, e.g., FIG. 1a for a TEM image of silica template nanoparticles in accordance with the first embodiment and FIG. 1b for a TEM image of carbon coated silica template nanoparticles in accordance with the first embodiment). Subsequent dissolution of the silica template nanoparticle supports yielded well-defined hollow carbon shapes that are illustrated in the TEM image of FIG. 2a. By manipulating the metal oxide template nanoparticle size and porosity, hollow carbon spheres with high specific surface area of 648 $m^2g^{-1}$ (see, e.g., FIG. 3a; and generally in a specific surface area range from about 100 to about 1500 $m^2g^{-1}$), 1 nm average pore diameter (see, e.g., FIG. 3b; and generally in a pore diameter range from about 0.5 to about 20 nm), and large internal void space (see, e.g., FIG. 2a) were facilely fabricated. In a final step of the synthesis, advantage was taken of the relatively low sublimation temperature of sulfur to infuse gaseous sulfur at high pressure into the mesoporous hollow carbon sphere shape supports present in one compartment of a closed, dual-compartment segmented tube, as is illustrated in FIG. 4. This methodology facilitates fast, efficient, and controlled infusion of elemental sulfur at high pressure (i.e., at least about 2 atmospheres, more preferably at least about 5 atmospheres and yet more preferably at least about 8 atmospheres, but more specifically in a range from about 2, 5 or 8 atmospheres to about 20 atmospheres) into the host porous carbon shape structure and yields carbon-sulfur particles with high tap density of at least about 0.82 $gcm^{-3}$. This particular methodology also contemplates use of an inert gas (i.e., such as but not limited to helium, neon or argon) which is heated in conjunction with elemental sulfur to assist in providing the foregoing elevated pressure in conjunction with sulfur infusion. As is illustrated in FIG. 5, thermal gravimetric analysis shows that approximately 35% sulfur can be incorporated in the particles in a single pass, and that by three passes (i.e. repeat exposures of the hollow carbon shapes to sulfur vapor), nearly 70% of the mass of the porous and hollow carbon shapes is comprised of infused sulfur.

Figure 2A:
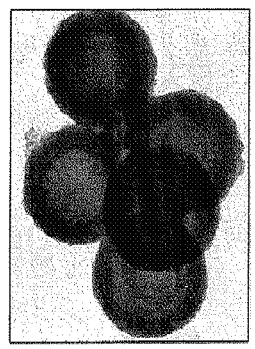
FIG. 2 shows transmission electron microscopy images of high surface area hollow carbon spheres (FIG. 2a), sulfur infused high surface area hollow carbon spheres (FIG. 2b) and a graph of Counts versus Energy for an energy dispersive x-ray (EDX) analysis of the sulfur infused high surface area hollow carbon spheres (FIG. 2c) in accordance with the first embodiment.
Figure 2B:
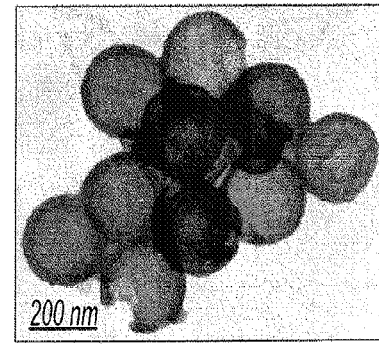
Figure 2C:
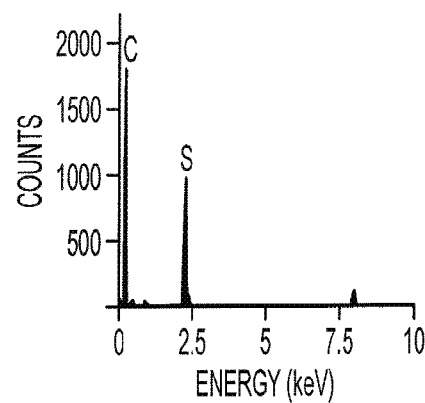

FIG. 2a and FIG. 2b show a transmission electron microscopy (TEM) image of typical hollow carbon material shape spheres before and after sulfur material infusion. The high surface area and relatively large mesopore sizes of the hollow carbon material sphere shapes are attractive since they are anticipated to allow an electrolyte and Li ions produced from a Li—S redox reaction to penetrate the hollow carbon material sphere shapes. While creating occasional ruptures in the walls of the hollow carbon materials sphere shapes (e.g. see bottom most hollow carbon material sphere shape in FIG. 2b), a pressure built-up in the Pyrex tube used for sulfur infusion is as described above integral for facilitating complete incorporation of the sulfur into the hollow carbon material sphere shape host in a fashion that provides desirable electrochemical properties. Elemental composition of the S@C nanocomposites analyzed by energy-dispersive x-ray (EDX) microanalysis is shown in FIG. 2(c). EDX spectra collected from different locations within the mesoporous S@C material also indicate the presence of sulfur materials throughout the porous hollow carbon material sphere shapes.

Figure 6:
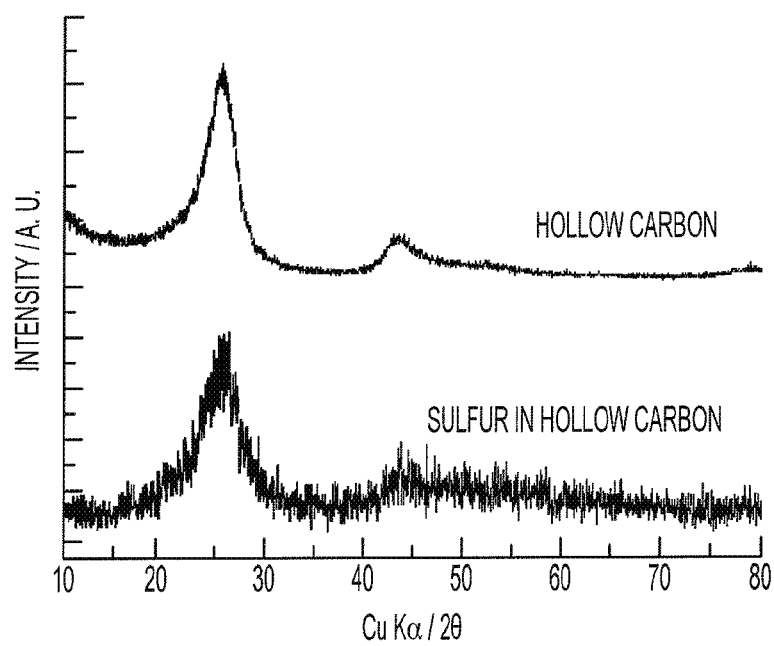
FIG. 6 shows an x-ray diffraction (XRD) analysis graph for high surface area hollow carbon spheres before and after sulfur infusion in accordance with the first embodiment.
Figure 7:
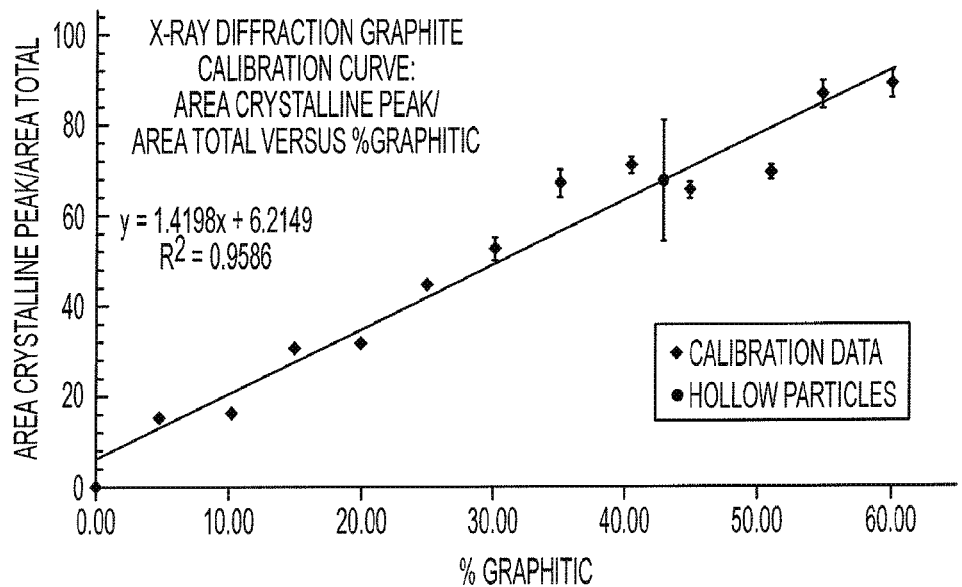
FIG. 7 shows an X-ray Diffraction Graphite Calibration Curve for estimating graphite content of the high surface area hollow carbon spheres in accordance with the first embodiment.
Figure 8:
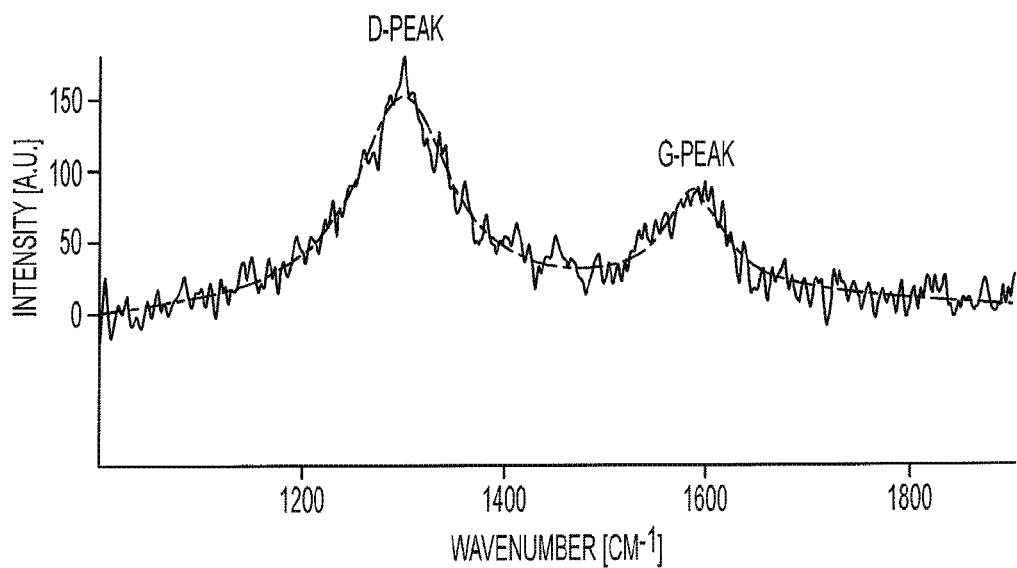
FIG. 8 shows a Raman spectrum of the high surface area hollow carbon spheres in accordance with the first embodiment.
Figure 9:
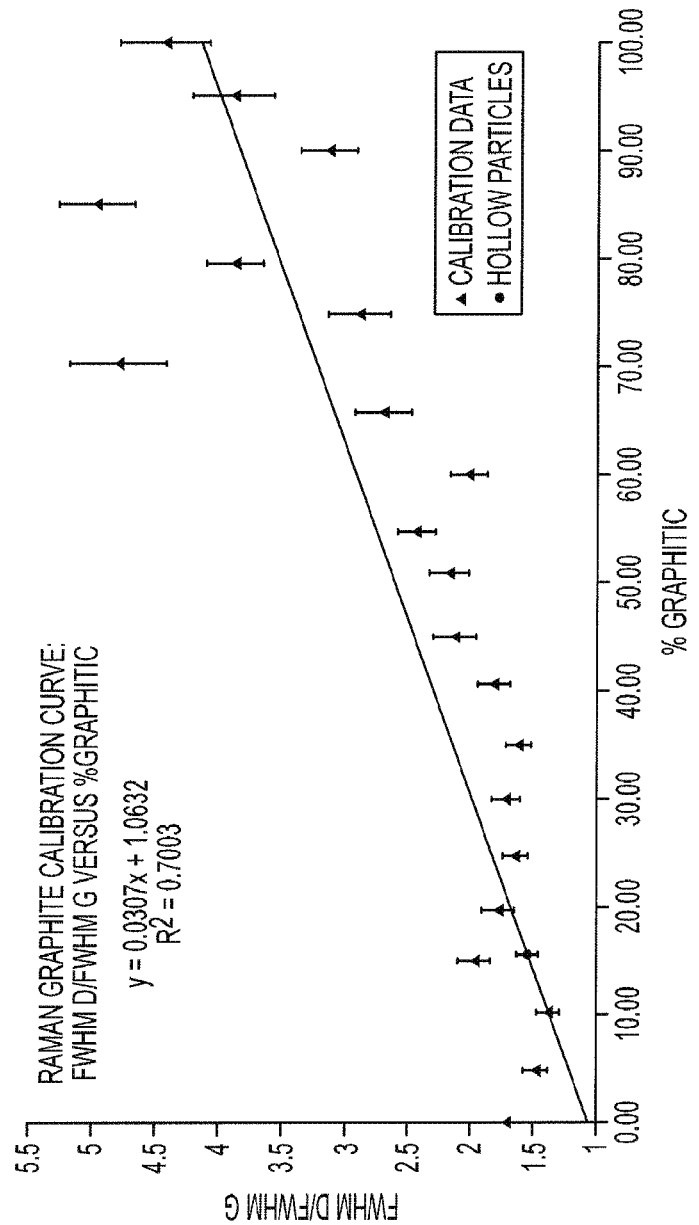
FIG. 9 shows a Raman Graphite Calibration Curve for estimating graphite content of the high surface area hollow carbon spheres in accordance with the first embodiment.

Elemental sulfur generally exists in a very stable orthorhombic crystalline structure. The absence of characteristic peaks for crystalline sulfur in the x-ray diffraction spectrum of FIG. 6 indicates a very low degree of sulfur crystallization in the S@C nanocomposite in accordance with this first embodiment. This suggests that the sublimed and infused sulfur is amorphous or that the sulfur particles trapped in the finest pores of the mesoporous hollow carbon shape spheres are unable to crystallize. XRD indicates, however, that the carbon material possesses some crystalline order, which is indicative of graphitic character for the materials considered here. The relative peak areas can be analyzed to estimate the degree of graphitization or the orientation of graphite planes. This analysis, as illustrated in FIG. 7, indicates that more than 38% of the material is graphitic carbon. The relative intensity of the D- and G-Raman scattering peaks at 1350 and ~1580 cm$^{-1}$, respectively provides a well-known alternative method for identifying carbon, as well as for assessing its graphitic content. The presence of both the D- and G-Raman bands in the carbon shape spheres is confirmed in the Raman spectrum shown in FIG. 8. The graphitic content can be estimated to be around 16%, and the difference between the two estimates may be attributed to a higher uncertainty of the Raman calibration curve FIG. 9. Because the electrical conductivity of graphitic carbon is substantially higher than of amorphous carbon, even partially graphitized carbon shape nanoparticles are attractive insofar as they facilitate transport of electrons from the poorly conducting infused sulfur, thus aiding electrochemical stability of the S@C nanocomposite hollow shapes even at high discharge rates.

Figure 10A:
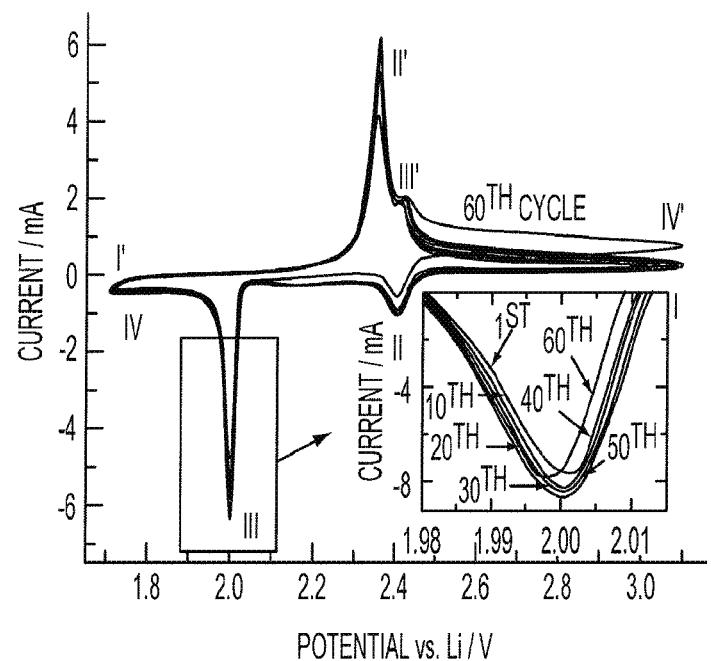
FIG. 10 shows a cyclic voltammogram (FIG. 10a) and voltage versus capacity profiles (FIG. 10b) for electrodes fabricated incorporating sulfur infused high surface area hollow carbon spheres in accordance with the first embodiment.

A cyclic voltammogram (CV) of an electrode incorporating the S@C nanocomposite is shown in FIG. 10a. The pair of sharp redox peaks indicates that during charge/discharge the electrochemical reduction and oxidation of sulfur occurs in two stages. The first peak at 2.4 V (designated as II) involves the reduction of elemental sulfur to lithium polysulfide ($Li_2S_n$, $4 \leq n \leq 8$). The second peak at 2.0 V (designated as III) involves the reduction of sulfur in lithium polysulfide to $Li_2S_2$ and eventually to $Li_2S$. The oxidation process in the Li—S cell also occurs in two stages. The oxidation peak at 2.35 V (designated as II') is associated with the formation of $Li_2S_n$ (n>2). This process continues until lithium polysulfide is completely consumed and elemental sulfur produced at 2.45 V (designated as III'). Significantly, no changes in the CV peak positions or peak current (inset in FIG. 10a) are observed, even after 60 scans, confirming the electrochemical stability of the S@C composites and indicating that the porous carbon structure is quite effective in preventing the loss of sulfur into the electrolyte and in maintaining high utilization of the active sulfur in the redox reactions.

Figure 10B:
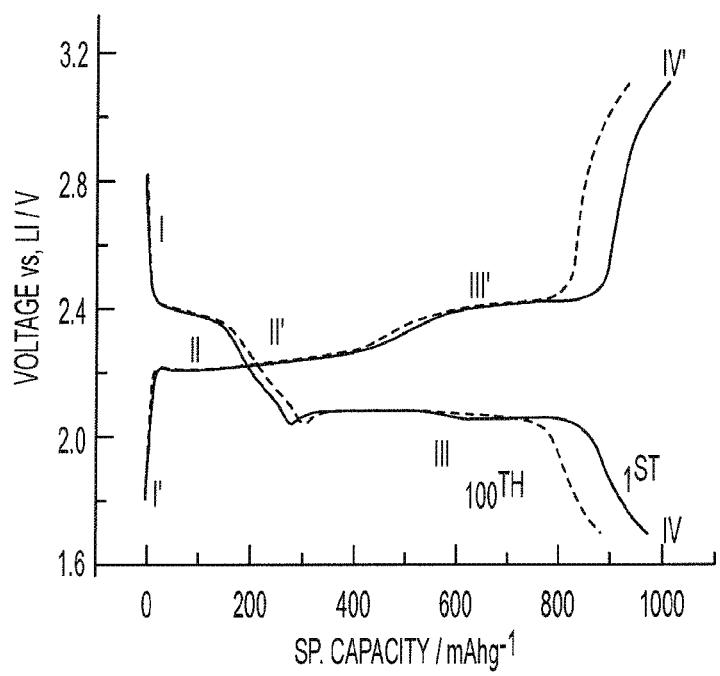

FIG. 10b shows typical discharge/charge voltage profiles for an electrode incorporating the S@C nanocomposite. It is immediately apparent from FIG. 10b that the discharge/charge voltage plateaus, marked as II, IV, II' and IV', exactly resemble the redox peaks observed in the CV scans, which are also marked as II, IV, II' and IV'. The oxidation peak at 2.45 V observed in the CV experiments has not been previously reported, though the corresponding charge plateau and reaction are well documented in the literature; its presence here nicely corroborates the reversibility of the electrochemical reactions occurring in the S@C nanocomposite. As shown in FIG. 10b, the as prepared S@C nanocomposites manifest an initial specific discharge capacity of 1071 mAhg$^{-1}$ and maintains a reversible capacity of 974 mAhg$^{-1}$ (at a rate of 0.5 C) with 91% capacity retention after 100 cycles. For completeness, FIG. 11c reports the corresponding specific capacities based on the combined mass of the S@C composite. It is evident from FIG. 11c that by either measure the specific capacity values are attractive from the point of view of intended battery applications. Additionally, no changes in the voltage plateaus are seen after 100 cycles, indicating that the electrochemical processes are substantially unchanged during extended cycling of the cell, which is also desirable for battery applications.

Figure 11A:
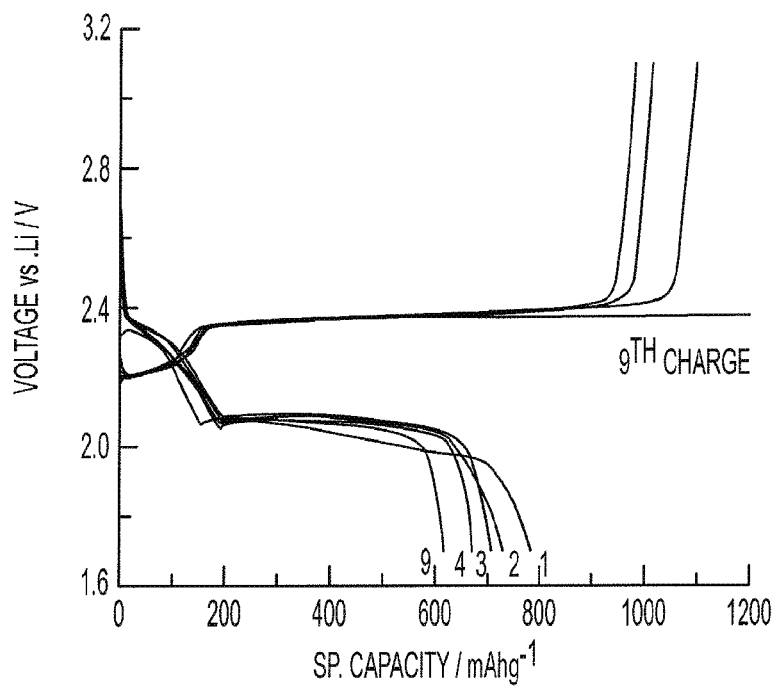
FIG. 11 shows Voltage versus Capacity (FIG. 11a) and Capacity versus Cycle Number (FIG. 11b) for pristine sulfur cells, as well as Capacity versus Cycle Number (FIG. 11c) based upon sulfur mass or sulfur/carbon mass, for comparison within the context of the first embodiment.
Figure 11B:
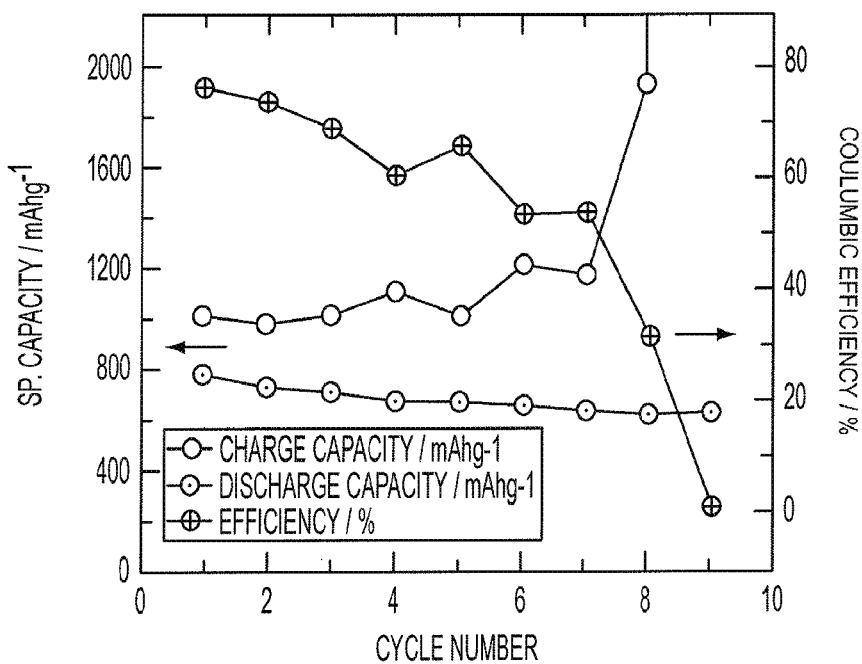
Figure 12:
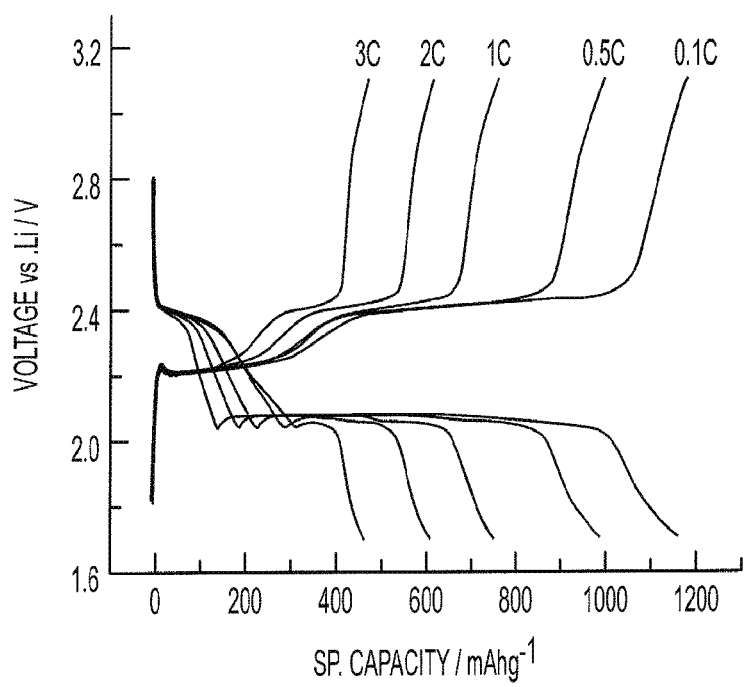
FIG. 12 shows Voltage versus Capacity for a lithium ion battery cell while varying a charge rate for a cathode that includes sulfur infused high surface area hollow carbon spheres in accordance with the first embodiment.
Figure 13A:
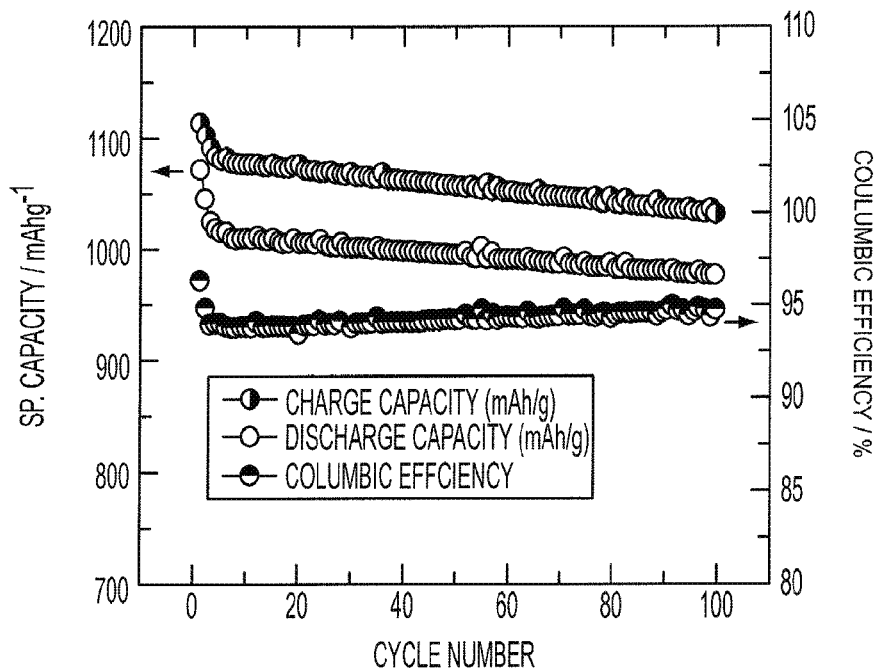
FIG. 13 shows graphs of Capacity versus Cycle Number yielding cycle life (FIG. 13a) and rate capability (FIG. 13b) for electrochemical cells fabricated using electrodes incorporating the sulfur infused high surface area hollow carbon spheres in accordance with the first embodiment.

FIG. 12 reports the voltage profile for the materials, which show the same pattern of discharge and charge plateaus even at very high current rates. The rate capability and cycle life behavior of the S@C nanocomposite are considered in greater detail in FIG. 13a and FIG. 13b. Specifically, FIG. 13a shows that there is some capacity fade upon extended cycling, but reveals no evidence of the dramatic capacity reduction characteristic of Li—S cells upon extended cycling. Since the reversible Li—$S_8$ redox reaction occurs via the non-topotactic assimilation process, the volume expansion due to sulfur incorporated into the host carbon structure, following subsequent discharge/charge reaction is anticipated to be small. On the other hand, the charge-discharge behavior of pristine sulfur shown in FIG. 11a and FIG. 11b, display a notable decrease in discharge capacity and an imperfect charging characteristic for a shuttle mechanism.

Figure 11C:
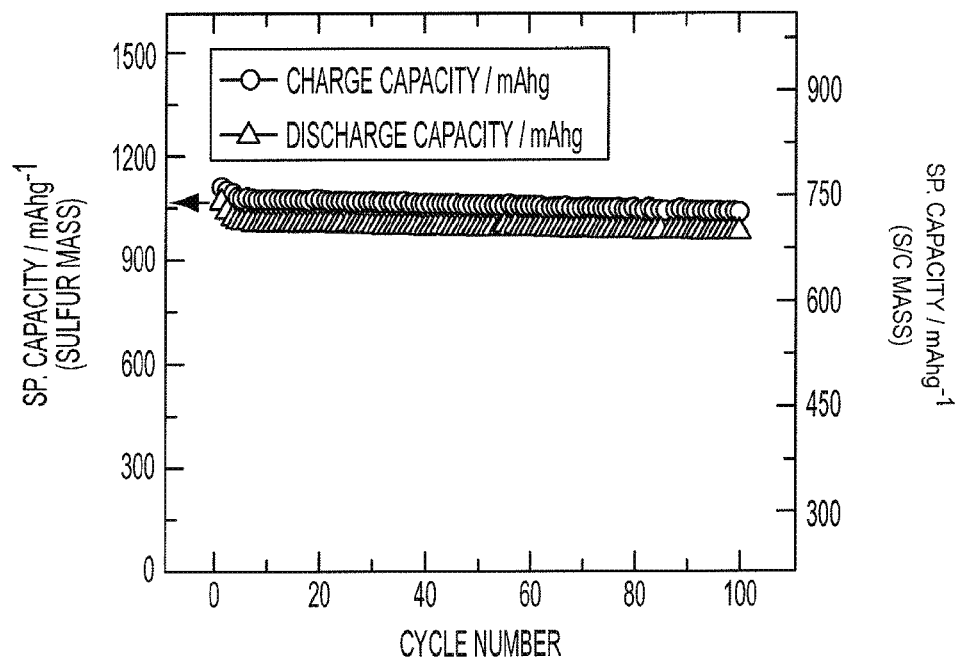
Figure 13B:
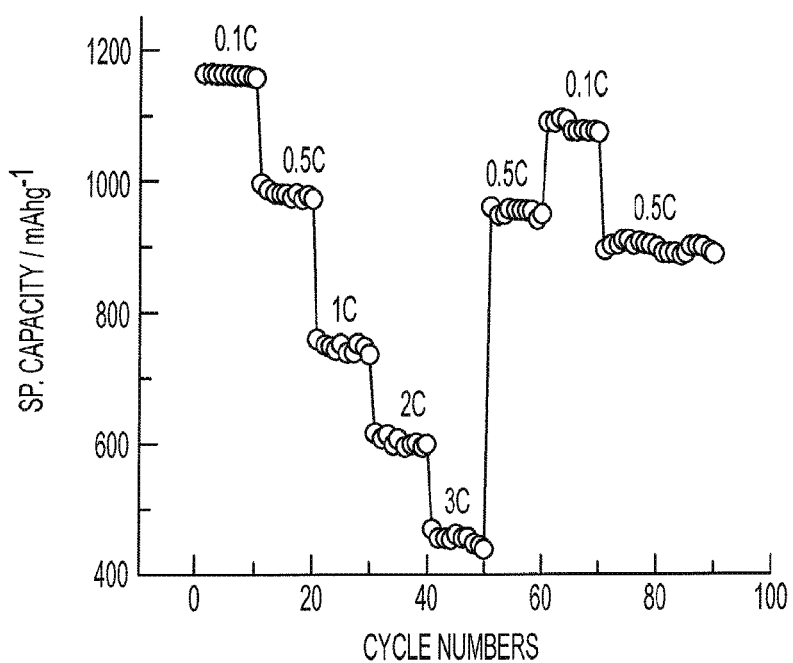

Once the shuttle mechanism is started, as can be seen in FIG. 11a, the charging behavior at about 2.4 V continues without overcharging, resulting in a decrease in charge efficiency at the end of the charge and the discharge capacity is reduced. The columbic efficiency of the S@C nanocomposite in the first cycle is computed to be 96% in comparison to 94% after 100 cycles, indicating reliable stability. In contrast, the columbic efficiency of pristine sulfur (see FIG. 11b) in the first cycle is calculated as 77%, which reduces to 31% by the end of 8 cycles. The pristine material subsequently displays the well-known continuous charging process due to an increased content of polysulfides in the electrolyte. The rate capability behavior of the S@C nanocomposite at higher rates is shown in FIG. 13b. At the maximum discharge rate studied, 3 C (5.1 A/g), the material is seen to deliver 450 mAhg$^{-1}$, which is an unprecedented result for a Li—S secondary battery cycled at this high rate. The stability of the cathode material is also evidenced by the recovery of a capacity of 891 mAhg$^{-1}$ at 0.5 C rate following charging at the rather high rate (for a Li—S cell) of 3 C (FIG. 13b).

The excellent overall electrochemical behavior of the as prepared S@C composites can be attributed to multiple, possibly synergistic factors that stem from their design. First, the mesoporous high surface area carbon host facilitates high levels of sulfur deposition onto, as well as into, the adsorbing carbon framework. Based on the exceptional electrochemical stability of the materials it is considered that confinement of sulfur in the pores and interior void space of this framework minimize loss of lithium polysulfides to the electrolyte and disfavors shuttling. Second, the partially graphitic character of the carbon framework is believed to provide mechanical stability to the deposited sulfur film and also allows effective transport of electrons from/to the poorly conducting active material. It is believed that this latter feature is responsible for the electrochemical stability of the material at high current densities; it is expected to improve as the graphitic content of the carbon shapes increase. Finally, the pores in the framework are large-enough to allow ready access by electrolyte and preserve fast transport of Li$^+$ ions to the active material.

In summary, a facile, scalable procedure is described above for synthesizing S@C nanocomposites based on mesoporous hollow carbon shapes. The method uses a template-based approach for synthesizing hollow carbon shaped particles with desirable features and high-pressure, vapor phase infusion of elemental sulfur into the pores and center of the carbon shapes to produce fast, efficient uptake of elemental sulfur. When evaluated as the cathode material in a Li—S secondary battery, the as prepared S@C nanocomposites display outstanding electrochemical features at both low and high current densities. The materials described herein are among the first to offer extended cycle life and high charge rate capability in a secondary Li—S battery. These observations are attributed to sequestration of elemental sulfur in the carbon shapes and to its favorable effect in limiting polysulfide shuttling, as well as to enhanced electron transport from the poorly conducting sulfur made possible by its close contact with the carbon framework.

A. Experimental Details

Mesoporous hollow carbon shape spheres were prepared by a hard template approach. In a typical synthesis, highly porous silica templates (2 g) synthesized by a conventional method were suspended in 50 ml of N-Methyl-2-pyrrolidone (NMP, Aldrich) solution containing 1.05 g of petroleum pitch (Carbonix, South Korea). The suspension was sonicated for 20 minutes and transferred to a rotavap for distillation and complete solvent removal at 110° C. The petroleum pitch coated silica particles were then vacuum dried at 110° C. for 12 h; calcination at 1300° C. for 12 h under argon flow followed. The carbon coated silica particles obtained in this stage were treated with HF (Aldrich) to etch away the silica template and then dried after subsequent washes with water and ethanol. Sulfur incorporation was performed using a high-pressure, vapor phase infusion method.

The S@C cathode slurry was created by mixing 92.5% of the composite (70% sulfur and 30% carbon hollow spheres) and 7.5% of PVDF binder in a NMP solvent dispersant. Positive electrodes were produced by coating the slurry on aluminum foil and drying at 120° C. for 12 h. The resulting slurry-coated aluminum foil was roll-pressed and the electrode was reduced to the required dimensions with a punching machine. The electrode thickness of the entire prepared electrodes was similar (~80 µm) after 85% reduction of the original thickness through the roll press. The same procedure was followed to prepare pristine sulfur cathode, except that the cathode slurry was made of 80% of elemental sulfur, 10% of Super P conducting carbon and 10% PVDF binder in NMP dispersant. Preliminary cell tests were conducted on 2032 coin-type cells, which were fabricated in an argon-filled glove box using lithium metal as the counter electrode and a micro porous polyethylene separator. The electrolyte solution was 1 M lithium bis (trifluoromethane sulfone) imide (LiTFSI) in tetraglyme. Cyclic voltammetry studies were performed on a Solartron's Cell Test model potentiostat. Electrochemical charge discharge analysis, under the potential window 3.1 to 1.7 V, was carried out using Maccor cycle life tester.

Figure 22A:
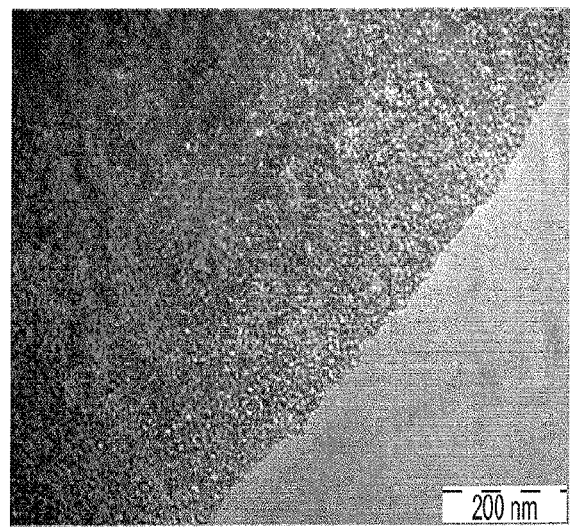
FIG. 22 shows a bulk porous carbon shape (FIG. 22a) and a sulfur infused high surface area bulk porous carbon shape (FIG. 22b) from which may be fabricated a sulfur infused high surface area nanoparticle material in accordance with an extension of the first embodiment.
Figure 22B:
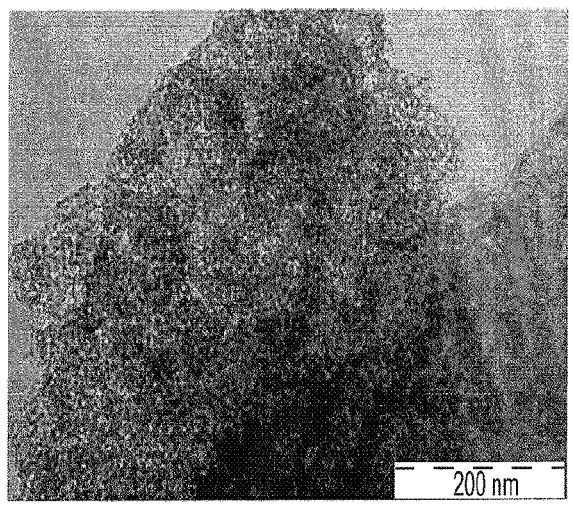
Figure 23:
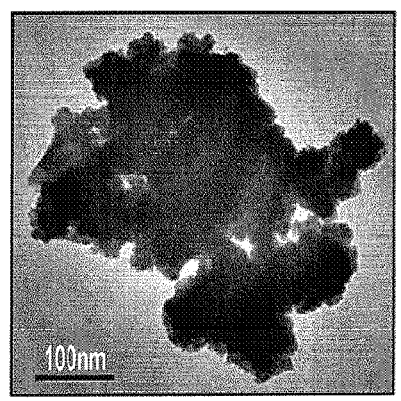
FIG. 23 shows a transmission electron microscopy (TEM) image of a sulfur infused high surface area nanoparticle material in accordance with FIG. 14a, but including a dimensional scale.

B. Considerations Related to Sulfur Material Infused Carbon Material Nanocomposites from Other Sources The elevated pressure vapor infusion approach used to create the mesoporous, hollow carbon-sulfur composite materials from petroleum pitch can be used to produce high-power sulfur cathodes using other carbon sources that are nominally bulk sources (e.g. coal, high-sulfur coal, charcoal, and organic polymer aerogels). FIG. 14, FIG. 22 and FIG. 23 for example, summarize results obtained using a commercial carbon precursor obtained by pyrolyzing a resorcional-formaldehyde polymer aerogel in an inert atmosphere environment. The material was provided as a gift by American Aerogel and is being marketed for insulation products. The carbon materials were first activated at temperatures ranging from 1000-1250° C. in an inert (argon) atmosphere. FIG. 22A shows a transmission electron microscopy image of the carbon aerogel material illustrating that following carbonization it is a formless mass (i.e., the material shows none of the nanostructuring of the carbon shape spheres described above). FIG. 22B shows a transmission electron microscopy image of the carbon aerogel after sulfur infusion in accordance with the method described above for sulfur infusion into hollow carbon material shape spheres.

Figure 14A:
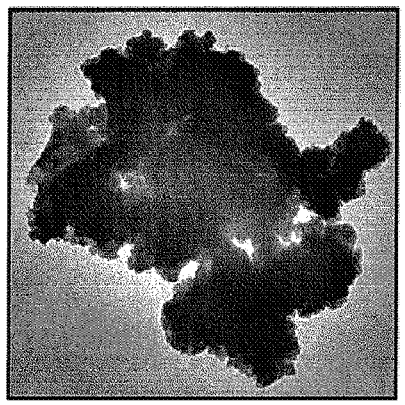
FIG. 14 shows a plurality of graphs and images illustrating extension of the sulfur infused high surface area hollow carbon spheres in accordance with the first embodiment to provide additional sulfur infused carbon nanoparticle electrodes that may be incorporated into lithium ion batteries.

FIG. 23 and FIG. 14a show nanoparticles that are formed incident to grinding of the sulfur infused carbon material formless mass of FIG. 22B. These resulting sulfur infused carbon nanoparticles were of size similar to the hollow carbon nanoparticle spheres described above, and they were fabricated into cathode electrodes using similar methods and materials.

FIG. 14B to FIG. 14E show, that this additional sulfur infused nanoparticle carbon material shares multiple features with the hollow carbon shape spheres described above.

Figure 14B:
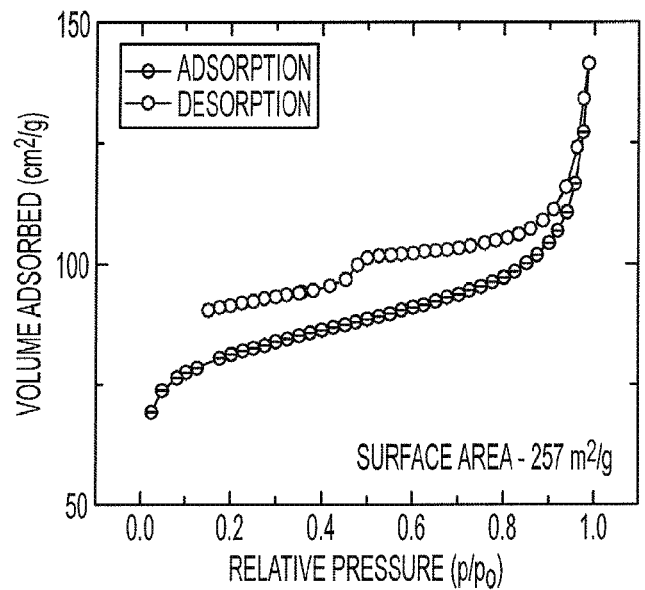
Figure 14C:
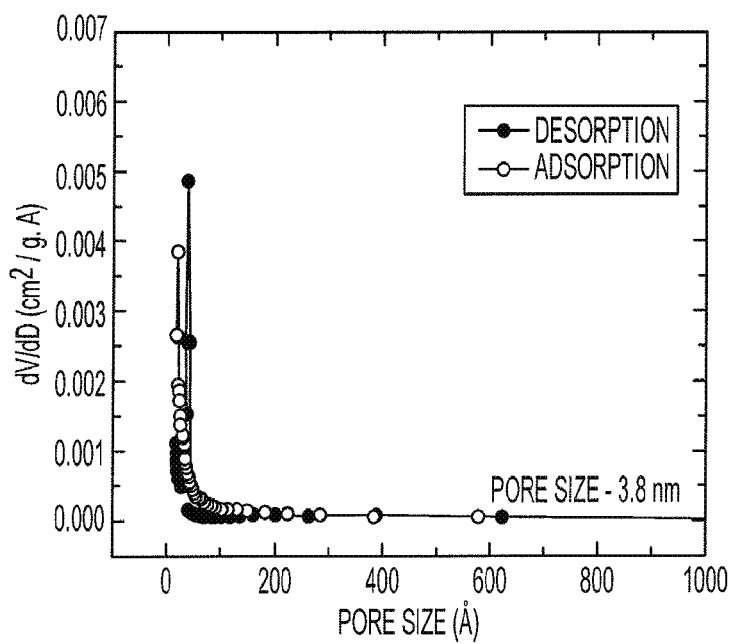
Figure 14D:
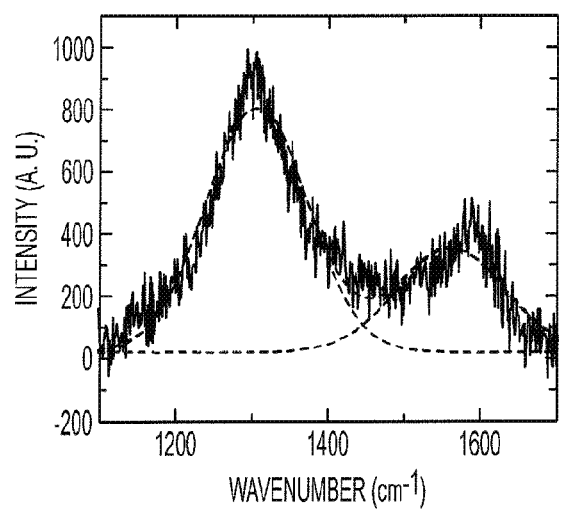
Figure 14E:
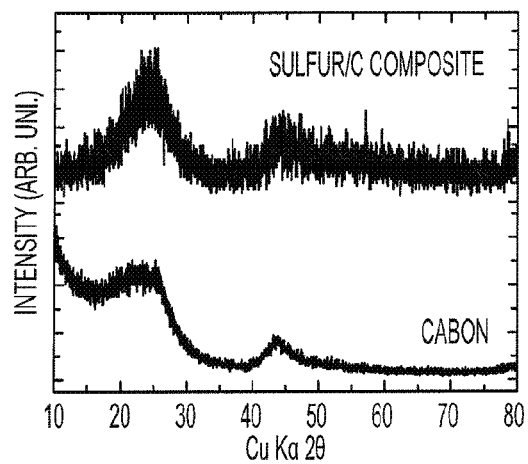
Figure 14F:
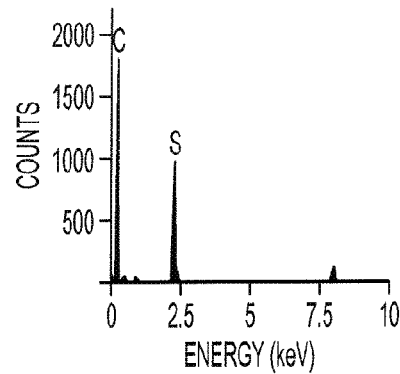

Specifically, FIG. 14B and FIG. 14C are results from BET porosimetry measurements, which show that the material has a high specific surface area (257 m2/g) and small average pore size (3.8 nm). FIG. 14D and FIG. 14E are the Raman and wide-angle x-ray diffraction spectra for the material. The presence of the G-band in the Raman spectrum and the distinct peaks in the x-ray diffraction spectra, imply that the material is crystalline. The upper plot in FIG. 14E is the x-ray diffraction spectrum of the material after infusion of sulfur using the same vapor phase sulfur infusion method that was used for the hollow carbon shape spheres. An energy dispersive x-ray (EDX) spectra of the material after sulfur infusion is shown in FIG. 14F, which shows that it is comprised of (i.e., consists of) carbon and sulfur only. The upper plot in FIG. 14E therefore implies that the adsorbed sulfur is amorphous. Quantitative analysis of the Raman and XRD data imply that at least 10% of the carbon is graphitic.

Figure 14G:
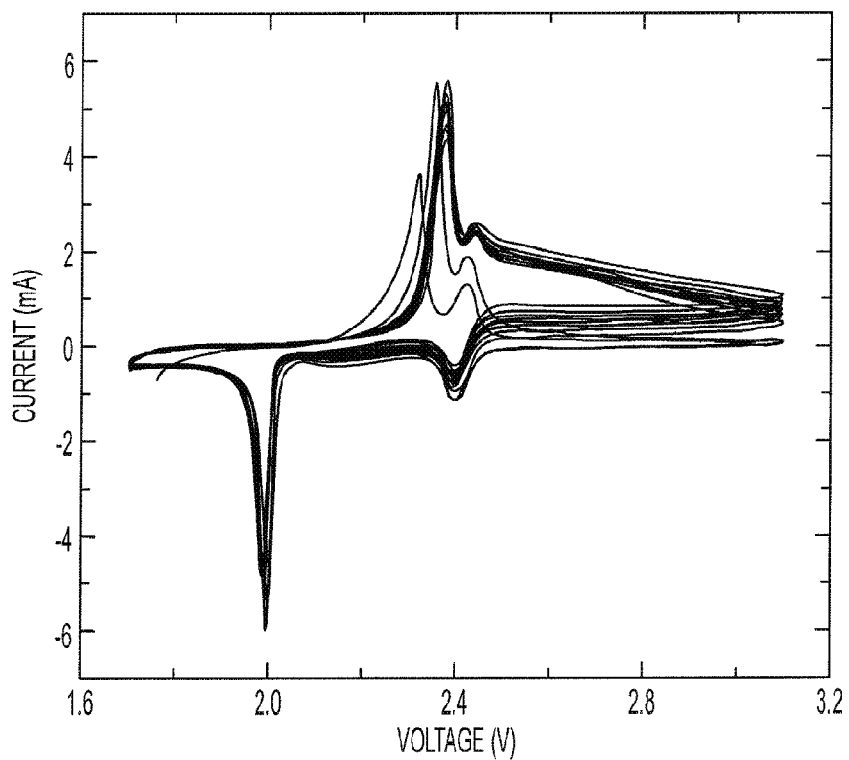
Figure 14H:
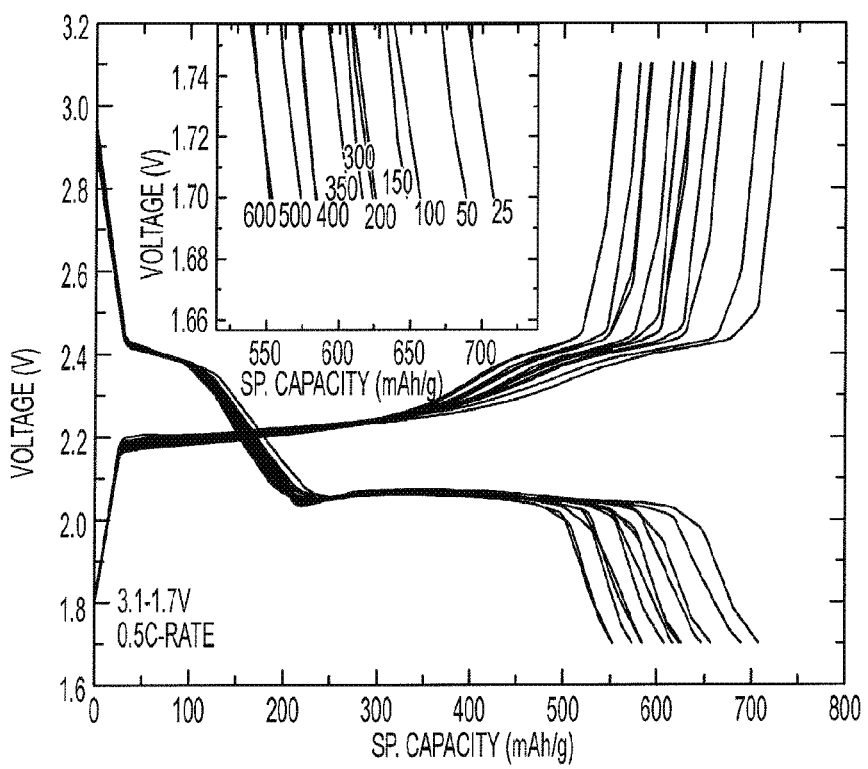
Figure 14I:
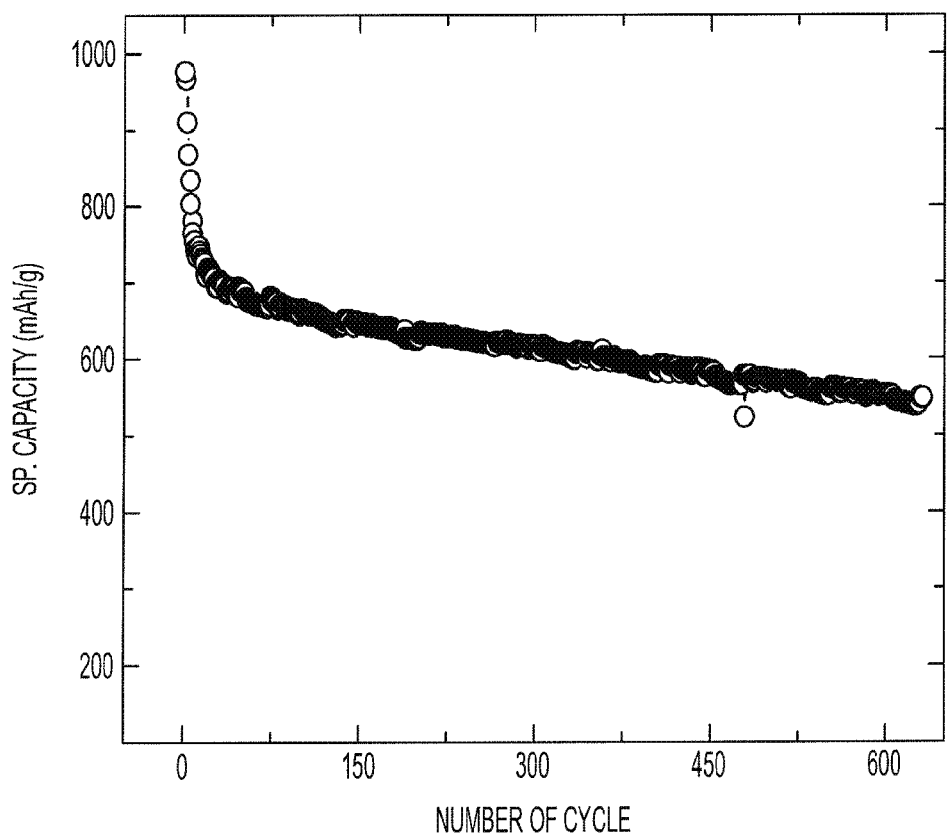

Thermal gravimetric analysis of the S/C composite indicates that 59% of the mass of the material is sulfur. As illustrated in FIG. 14G and FIG. 14H, cyclic voltammetry (in particular) and related electrochemical measurements show that the S/C composite obtained using the American Aerogel material is electrochemically stable and for all practical purposes identical to the S/C composites obtained using mesoporous, hollow carbon shape spheres as described above. FIG. 14I shows the energy storage capacity at a charge rate of 0.5 C achieved when the material is used as the cathode in a coin cell employing lithium metal as anode. The data of FIG. 14I show that the material delivers capacities over 600 mAh/g after more than 600 charge-discharge cycles. The specific capacity and capacity retention of the S/C composite cathodes are modestly lower than those observed for the carbon spheres, but this difference may presumably be readily removed by increasing the level of sulfur infusion (e.g. using multiple passes).

S/C composite particles can be created using a variety of other carbon sources (polyacrylonitrile (PAN), polysaccharides (e.g. glucose), citric acid, gallic acid, cynnamic acid and polymeric cores (e.g. polystyrene, polymethylmethacrylate). Following high-temperature pyrolysis, the elevated pressure vapor infusion yields S/C composites with >50% sulfur incorporation and electrochemical performance comparable to S/C hollow shape sphere particles.

The same approach used for creating S/C composites should be applicable to other, more widely available carbon materials (e.g. coal). Specifically, if coal (ideally a high-sulfur variety) contains at least 5% by weight graphitic carbon after thermal treatment, electrochemical and/or mechanical grinding can be employed to create high surface area nanosized carbon particles compatible with the foregoing template processing. Using the elevated pressure vapor infusion method it is possible to create S/C composites with comparable energy density and electrochemical cycling stability as the hollow carbon shape materials described above.

II. Sulfur Containing Nanoparticles Comprising Vulcanized Polymultiene Polymer Materials and Ion Conducting Polymer Materials The second embodiment also describes a novel material for capturing and sequestering sulfur at a cathode within a lithium ion battery. The basic configuration of such a material is a silica (or other metal oxide) particle at a core linked by many polybutadiene (PBD) (i.e., more generally polymultiene polymer material) polyethyleneglycol (PEG) (i.e., more generally ion conducting polymer material) diblock copolymer strands. The PBD is cross linked with sulfur and the flowing polymer strands that are tethered to the silica (or other metal oxide) particle help the capture of sulfur. As PBD is known to have a very low conductivity, PEG which has a much higher conductivity is linked to the PBD, creating a diblock copolymer shell around the silica particle. The configuration described is that of a NOHMS (nanoparticle organic hybrid material system). NOHMS is a novel material configuration that attaches organic polymer dendrites to a core material such as silica. The core material can simply function as an anchor to form a dendrite shell layer around it or can also provide a specific property of its own. The multicomponent hybrid material brings about a synergistic effect by combining the properties of several components in the nanoscale. For this second embodiment, the foregoing NOHMS configuration has enhanced the capture of sulfur from leaving the area near the cathode as the dendrites function in making diffusion rather difficult.

Figure 15:
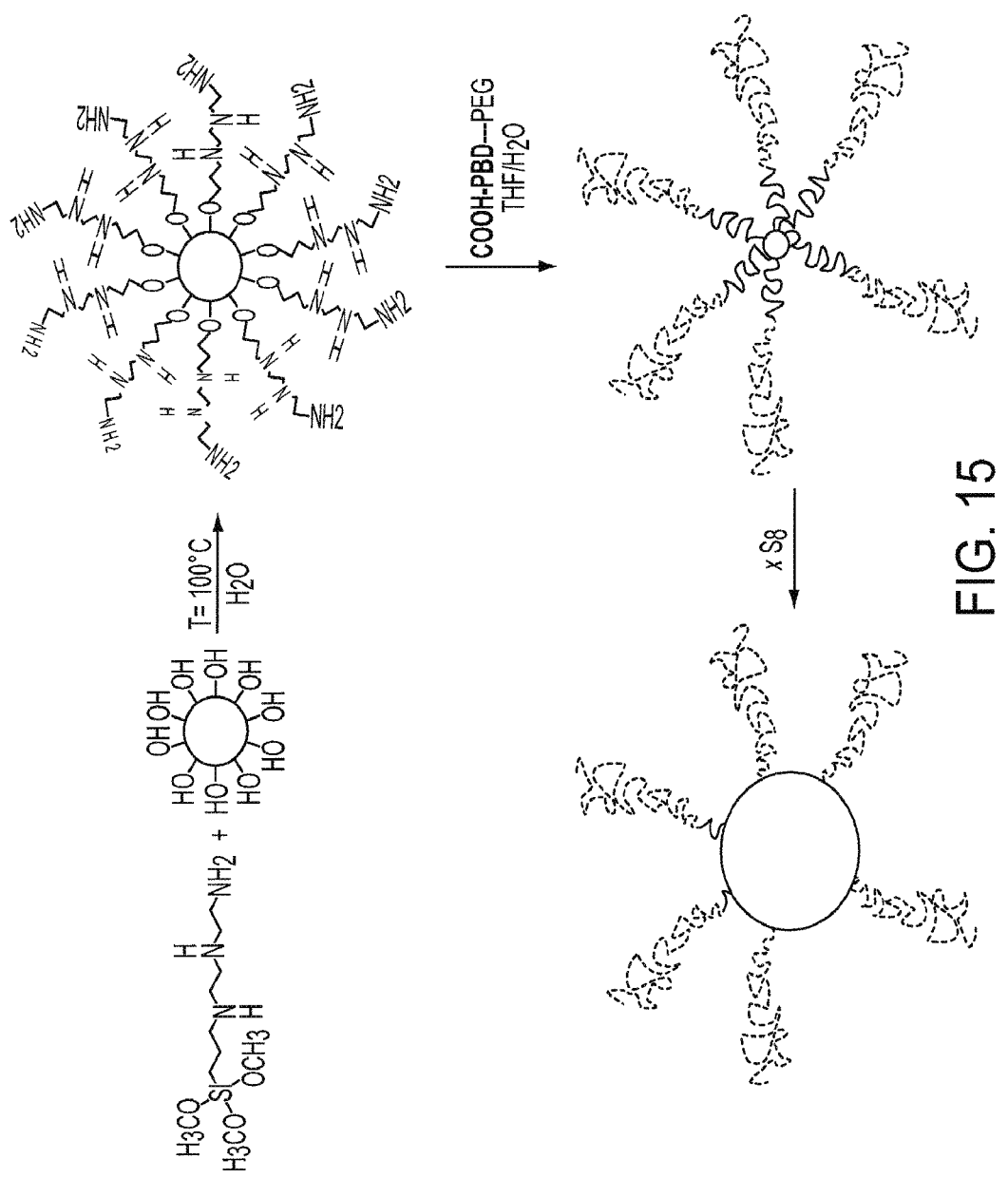
FIG. 15 shows a diagram illustrating a generalized synthetic scheme for synthesizing a plurality of sulfur sequestered nanoparticle materials in accordance with a second embodiment.
Figure 16:
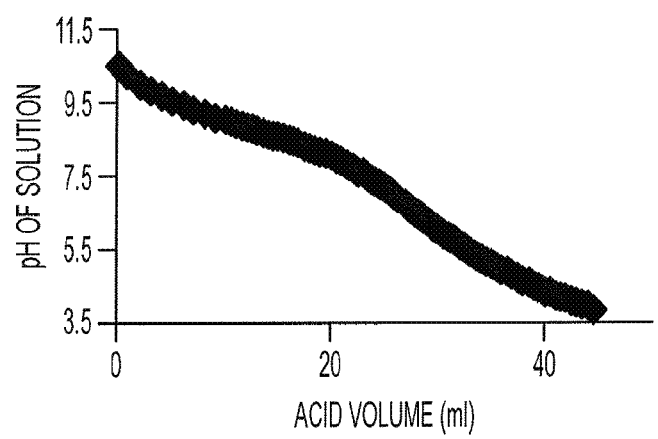
FIG. 16 shows titration data for forming a sulfur sequestered nanoparticle material in accordance with the second embodiment.
Figure 16:
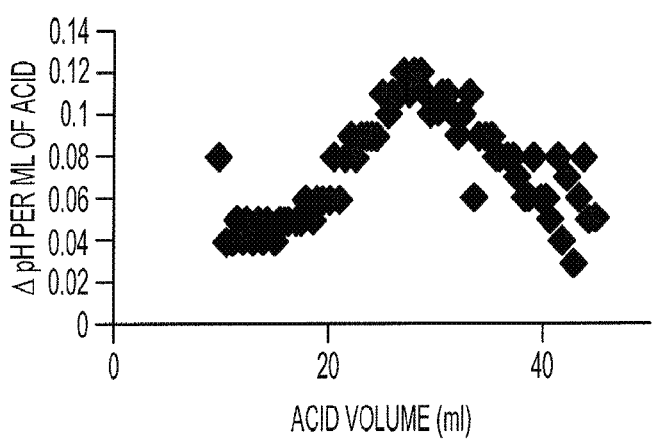

As illustrated in FIG. 15, a synthetic scheme shows an overall process employed in fabricating Silica/PBD/Sulfur/PEG nanoparticles in accordance with the second embodiment. First, amine functionalized silica nanoparticles were synthesized by utilizing a modified Stober process. To functionalize the silica outer layer with amine groups, 3-trimethoxysilypropyl-diethylenetriamine was used. Also in order to lessen the aggregation of the silica particles polyethylene glycol methyl ether was used with the silane. To control the size of the nanoparticles, different amounts of ammonium hydroxide were used. Then, the amine functionalized silica particles were used as an anchor to attach dicarboxy terminated polybutadiene strands. The mono functionalized polyethyleneglycol was then attached to the free carboxy terminal. The process was performed using N,N-dimethylformamide as the solvent. Alternative synthetic schemes are also considered that may reverse ordering of the alternate levels of functionality and the order of bonding of the PBD and PEG materials to a core metal oxide material. As well, and as needed, particular types of chemical functionality of PBD and PEG materials may be adjusted and selected accordingly FIG. 16 shows a titration curve for the amine group functionalized silica particles. The equivalence point indicates that the amine functionality is $5.33 \times 10^{-7}$ moles/mg of silica particle. The amine groups are from the silane and they surround the outer core of the silica particles. The amine functionalized outer layer was fabricated instead of a hydroxyl outer layer created by the non-modified Stober process since the dicarboxy polybutadiene will bond better with amine groups.

Size distribution measurements of the silica particles indicated an average size of 49.9 nanometers, a number PSD of 31.3 nanometers, an intensity PSD of 62.4 nanometers and a PDI of 0.204. The zeta potential was −16.5 mV with a standard deviation of 18.8 mV, a conductivity of 0.447 ms/cm, an effective voltage of 147.6 volts and a count rate of 45.3 kcps, showing that the particles would not aggregate and as the zeta potential for pure silica particles is −31 mV, one can see that the surface configuration has changed. Although the standard deviation showed that some of the particles would have a positive zeta potential, NaOH was added during the synthesis to minimize aggregation. In addition, NaOH had another purpose of reducing the hydrogen bonding interaction between the silica particles and the methanol solvent, which caused gel formation.

Figure 17:
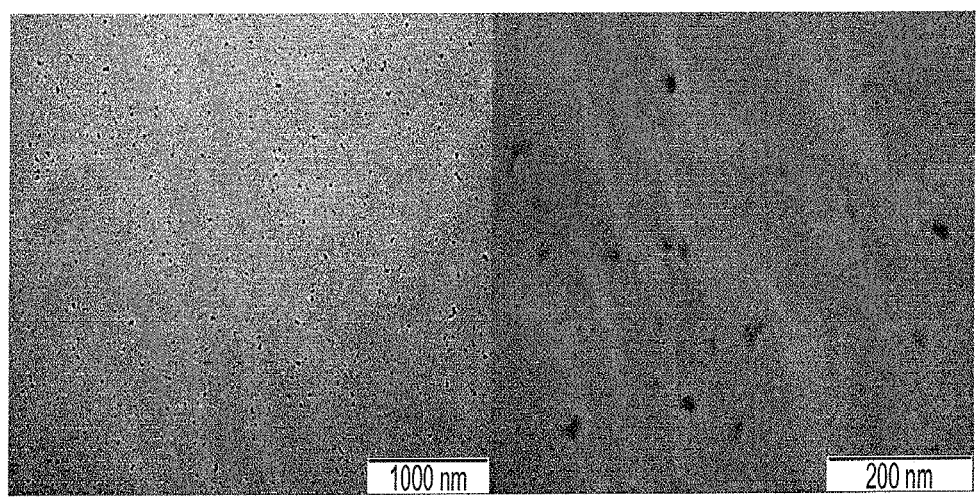
FIG. 17 shows scanning electron microscopy (SEM) images of sulfur sequestered nanoparticle materials in accordance with the second embodiment.

The particle size data from the zetasizer was verified using TEM. FIG. 17 shows the TEM image of the amine functionalized silica nanoparticles. FIG. 17 shows that most of the particles were between 15-45 nm. It was difficult to find particles with diameters greater than 60 nm. During the synthesis the amount of ammonium hydroxide added was generally determinative to achieving a particular size of the silica particles. Addition of 2 ml NH4OH:3 ml TEOS resulted in a particle size of 5-10 nm while 3 ml NH4OH:3 ml TEOS resulted in a particle size of 60-70 nm. The particle size of approximately 30 nm was chosen in order to have particles with enough amine functionality per particle in order to achieve fluidic behavior of silica NOHMS particles while keeping the silica fraction small.

Figure 18A:
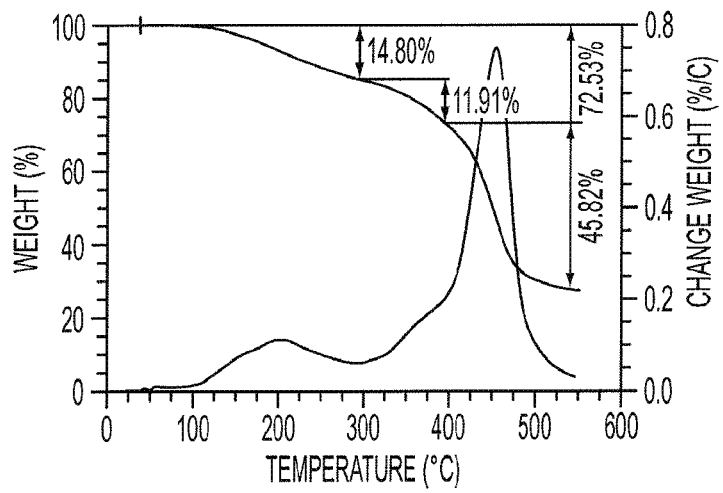
FIG. 18 shows thermal gravimetric analysis (TGA) spectra of sulfur sequestered nanoparticle materials in accordance with the second embodiment.

The TGA graphs in FIG. 18 show the composition of the polymer linked silica nanocomposite particles. In FIG. 18a there are three peaks for the compound. The first peak is physisorbed water and DMF that was used as the solvent during the synthesis.

Even though the solvent was driven off by an extensive drying process (48 hours in the oven at 70 C and 24 hours in freeze drier), all the water and DMF was not driven off. However, the temperature could not be increased further because the PBD may crosslink at higher temperatures. The second peak is that of the silane that surrounds the silica particle. A TGA of the silica particle alone showed a peak around 400 C indicating the silane decomposition temperature. The third compound that is thermally desorbed is the PBD and the compound left after 550 C is the silica core particle.

Figure 18B:
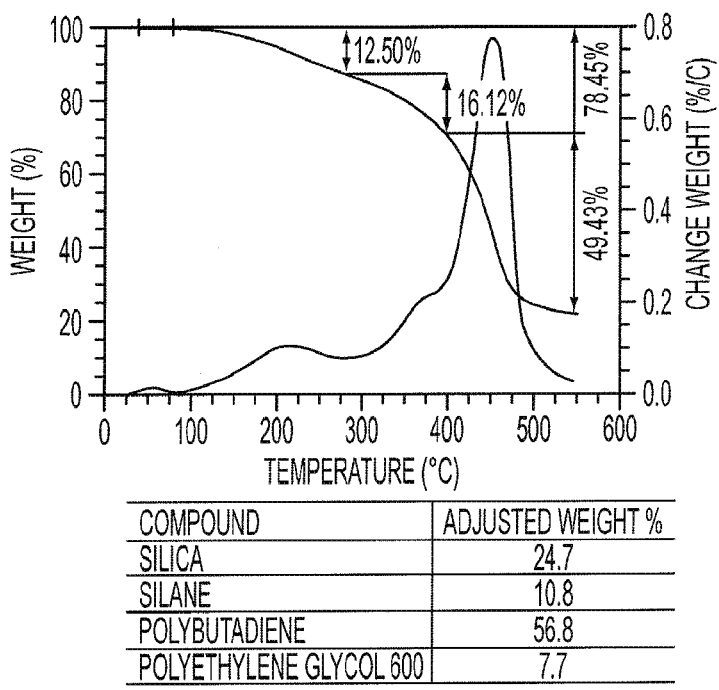

FIG. 18b is the TGA graph after linking PEG600 to the silica-PBD nanocomposite particle. The PEG600 polymer has a decomposition temperature that overlaps with that of silane. So the second peak indicates both silane and PEG600. Since the relative ratio between silica and silane is known, one may deduce the amount of PEG600 in the nanocomposite. The ratio of PBD to PEG600 was approximately 7 to 1 which is the ratio between their molecular weights. This may indicate that the PEG600 is well distributed and that the PBD and PEG particles are linked.

Figure 18C:
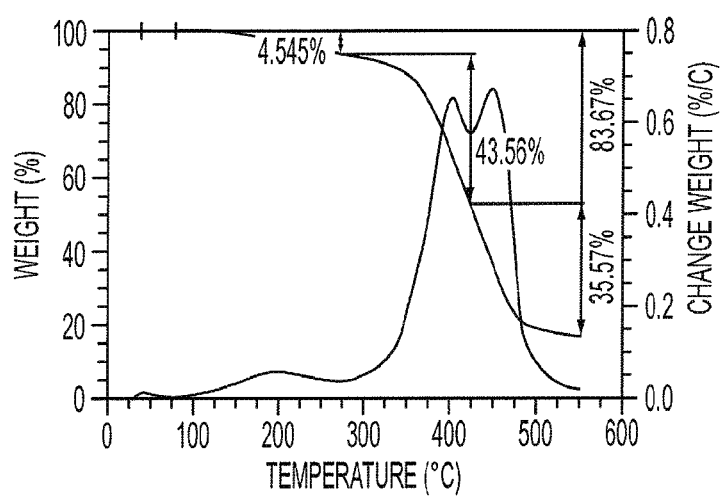

FIG. 18c is the TGA graph after linking PEG2000 to the silica-PBD nanocomposite particle. The PEG2000 had a decomposition temperature that overlapped with the silane but its intensity was much greater. The PEG2000 amount was also calculated by deducting the amount of silane from the second peak. Even though the molecular weight of PEG2000 is lower than that of PBD, the weight fraction is similar. An additional centrifugation step may decrease the PEG2000 content.

Figure 19:
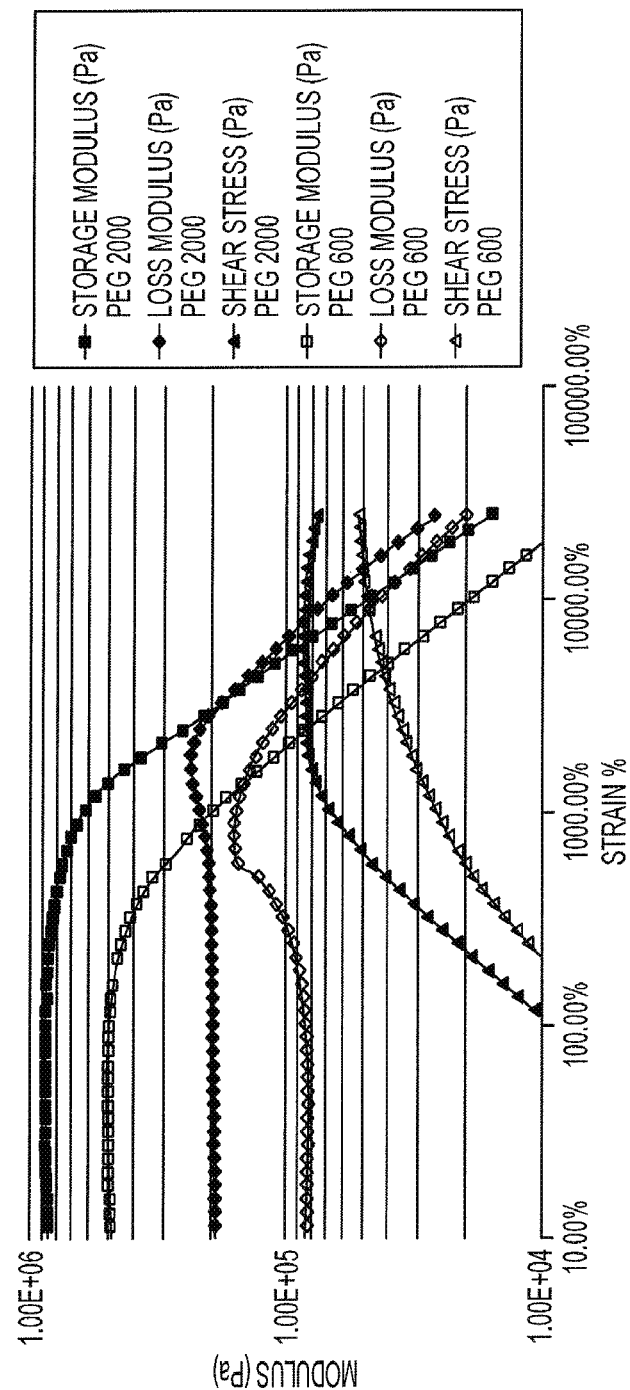
FIG. 19 shows a Modulus versus Strain diagram for sulfur sequestered nanoparticle materials in accordance with the second embodiment.

FIG. 19 shows the rheological data of the NOHMS particles and was measured using a flat 9.958 mm diameter plate while varying the strain amplitude at constant w. The temperature was set to 100 C. The gap between the plates was 0.11 mm for the PEG600 nanocomposite and 0.18 mm for the PEG2000 nanocomposite.

Rheology data was collected to determine the class of the particle created. From FIG. 19, one may conclude that both particles are in the group of soft glasses. It was identified that the pronounced peak of the loss modulus after the fall of the storage modulus is a robust feature of soft glassy materials. This peak shows the material's transition from a solid to liquid-like behavior. Especially, the crossover of the storage modulus and loss modulus shows that the liquid-like behavior of the nanocomposite takes over the solid-like behavior. The polymer strands that form the outer lining of the silica particles intertwine with those of neighboring silica particles. As more strain is imparted to the particles, the loss modulus rises indicating energy dissipation and when the polymers break free of one another the loss modulus drops. The energy required to achieve the loss modulus peak and the fall in the storage modulus are at similar strains. The flat storage modulus is a characteristic of elastic polymers and its fall indicates that the particles are transitioning to a more freely flowing particle. From FIG. 19 one may also see that the shorter PEG polymer shows the peak at lower strain and this may be caused by shorter chain lengths.

Figure 20B:
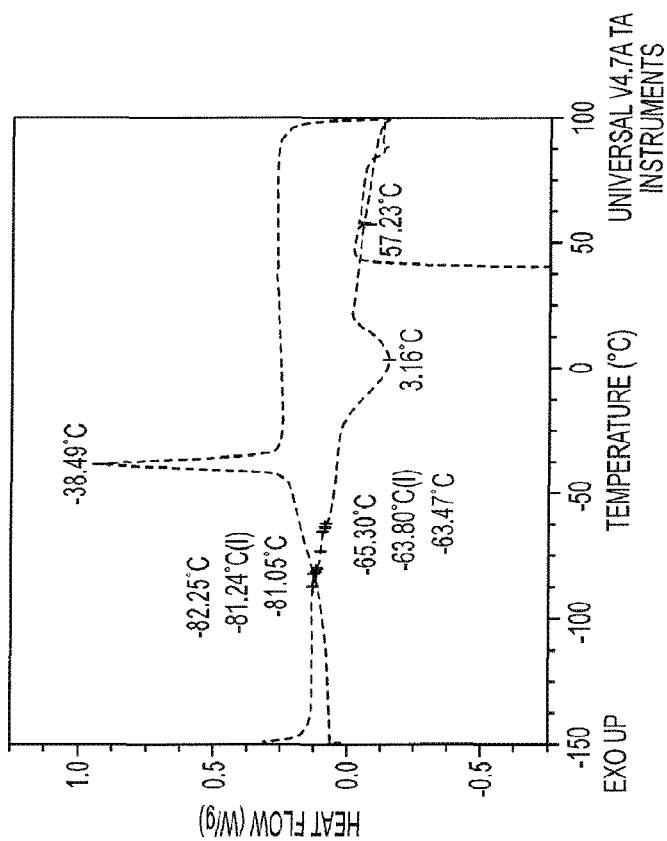
FIG. 20 show differential scanning calorimetry (DSC) spectra for sulfur sequestered nanoparticle materials in accordance with the second embodiment.
Figure 20A:
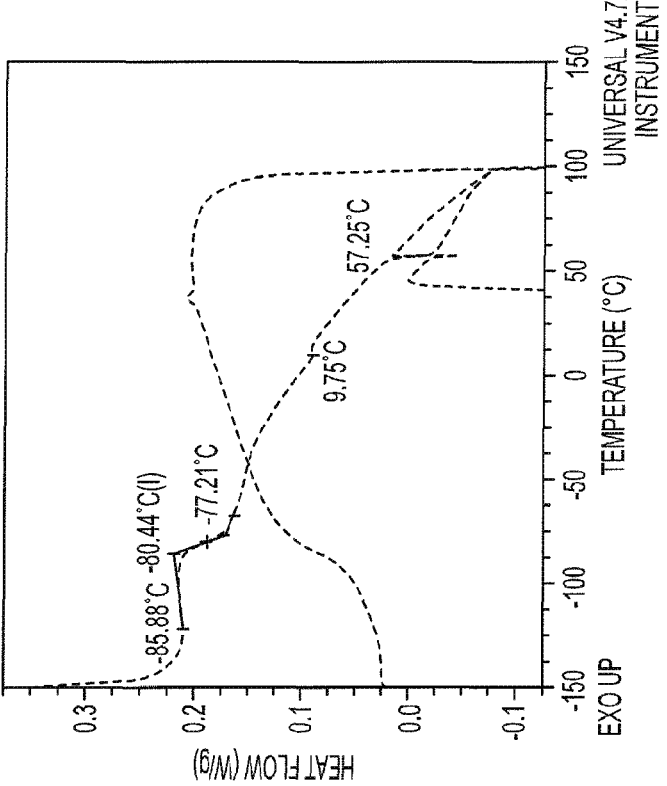

FIG. 20 shows the DSC graphs for the Silica-PBD-PEG600 and Silica-PBD-PEG2000 nanocomposites. Silica-PBD-PEG600 nanocomposite had a Tg at −80.44 C for the PBD. In comparison, silica-PBD-PEG2000 nanocomposite had two Tg which were at −81.24 C and −63.80 C. The first Tg was for the PBD which has a Tg of −77 C on its own. The second Tg was for the PEG2000. The Tg for the PEG600 was difficult to observe in the data. Also the PEG2000 nanocomposite had a Tc at −38.49 C but the PEG600 nanocomposite did not show any Tc. The Tm for the PEG600 was at 9.75 C while that of PEG 2000 was at 3.16 C. Usually higher molecular weight polymers have higher melting points but the data showed otherwise. Tm of PEG2000 alone is approximately at 60 C. This is probably due to the interaction of the PEG2000 with the PBD.

Figure 21:
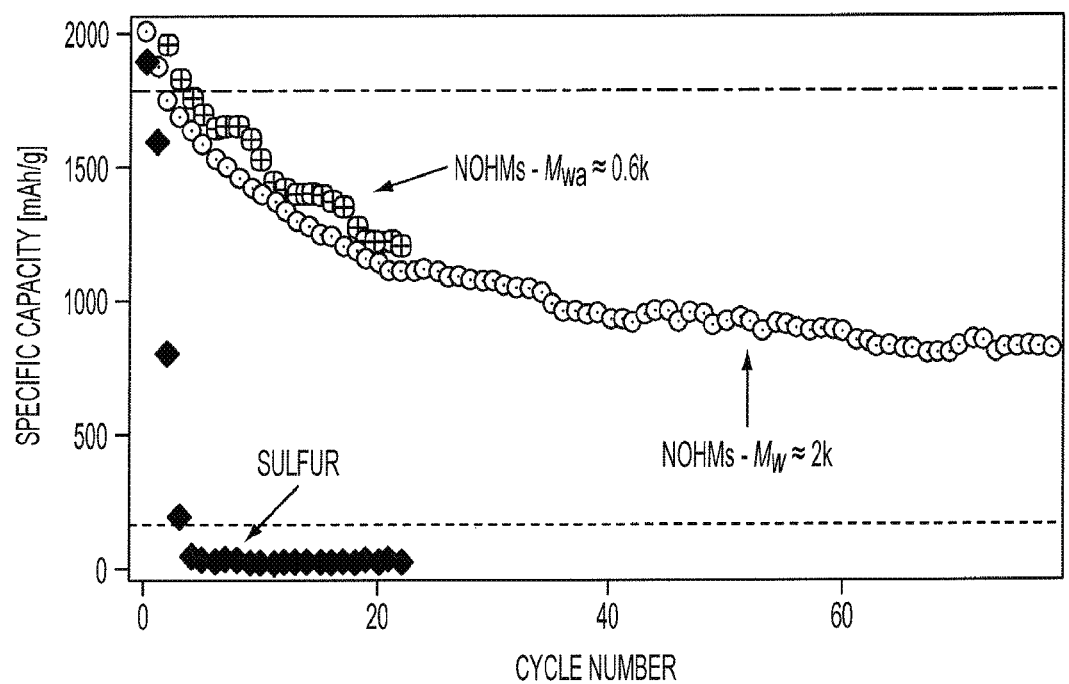
FIG. 21 shows a cyclic performance graph illustrating capacity versus cycle number for lithium ion batteries incorporating the sulfur sequestered nanoparticle materials in accordance with the second embodiment.

FIG. 21 shows the cyclic performance of Li/S batteries fabricated using the NOHMS composites described above. The results show that compared to the sulfur cathode battery which was used as a control, the NOHMS batteries show substantially higher cyclic performances in terms of limited capacity loss as a function of cycling.

Cathode material compositions for the batteries evaluated in FIG. 21 are shown in Table 1, as follows, For synthesizing amine functionalized silica particles, 3 ml of tetraethyl orthosilicate (Aldrich), 60 ml of methanol (Aldrich), and 2.5 ml of ammonium hydroxide (EMD) were mixed and left to stir for 30 minutes. Then 2.5 ml of 3-trimethoxysilylpropyl-diethylenetriamine (Silane) (Gelest), 2.5 grams of polyethylene glycol methyl ether (mPEG) (Aldrich), and 20 ml of methanol was added to the original mixture. After an additional five minutes, 2 ml of 0.6M NaOH solution was added. This mixture was left to react for an additional 12 hours.

A Nano Zetasizer apparatus (Nano-ZS Malvern Co.) was used to measure the size and zeta potential of the silica particles. The measurements were performed using methanol (Visc=0.5476, RI=1.326) as the solvent, and silica (Abs=0.10, RI=1.500) as the particle. To measure the amine functionality of the particles, 20 ml of the silica solution was mixed with 20 ml of DI water and left in a 70 C oven until the methanol and ammonia solution evaporated. Titration using a pH meter was performed to obtain the equivalence point. The sodium hydroxide that was still in the sample was accounted for in the titration calculation. TEM (FEI Tecnai 12 Spirit Twin) analysis was used to verify the size and presence of silica particles in the solution.

For polybutadiene linkage to silica, first, a hot plate was used at 150 C to heat and stir 100 ml of N,N-dimethylformamide (DMF) (Aldrich). 50 ml of the methanol solution with silica particles was slowly added to the DMF. The mixture was stirred for an hour to remove the methanol and ammonia. 12.5 grams of dicarboxy terminated polybutadiene (PBD) (Mn=4200 Aldrich) and 50 ml of tetrahydrofuran (THF) (JT Baker) was mixed and stirred until the polymer completely dissolved. The amount of the polymer was chosen so that there would be 4 times molar excess of the carboxylic groups of the PBD compared to the amine groups on the silane. The volume of the silica DMF solution was set to 50 ml by adding more DMF to the solution. The PBD THF solution and silica DMF solution was mixed by slowly adding the silica DMF solution. The reaction was left to continue for 24 hours. Centrifugation (AccuSpin 400 Fisher Scientific) was used to separate out the silica-PBD particles. The free PBD including supernatant was discarded and the precipitates were collected. Additional centrifugation was

TABLE 1

| | Cathode | | | | | | |
|---|---|---|---|---|---|---|---|
| | Sulfur | | Vulcanized Sulfur | | NOHMS 600 | | NOHMS 2000 |
| | | | | Weight Composition | | | |
| Compound | (%) | (phr) | (%) | (phr) | (%) | (phr) | (%) |
| Sulfur | 60% | 12.0 | 5.8% | 6.8 | 3.6% | 4.6 | 2.5% |
| Carbon B | 20% | 41.7 | 20.0% | 38.1 | 20.0% | 36.6 | 20.0% |
| PVDF-HFP | 20% | 41.7 | 20.0% | 38.1 | 20.0% | 36.6 | 20.0% |
| Tetraethylthiuram disulfide | 0% | 2.0 | 1.0% | 1.1 | 0.6% | 0.8 | 0.4% |
| ZnO | 0% | 8.0 | 3.8% | 4.5 | 2.4% | 3.1 | 1.7% |
| Stearic Acid | 0% | 3.2 | 1.5% | 1.8 | 1.0% | 1.2 | 0.7% |
| PEG + Silane + Silica | 0% | 0.0 | 0.0% | 43.2 | 22.7% | 61.7 | 33.8% |
| PBD | 0% | 100.0 | 47.9% | 56.8 | 29.8% | 38.3 | 21.0% |

In the performed experiment within the context of FIG. 21, the sulfur content varied for different types of batteries. This is because the sulfur content was kept at 12 per hundred rubber (phr), in which the rubber only indicates the weight of the PBD. As the % weight content of PBD changed, that of sulfur changed as well for each type of battery.

Experimental Details performed in a solution of 4:3 volume ratio of THF and DMF. This ratio was chosen since PBD started to precipitate when equal volume amounts of THF and DMF were used.

For polyethylene glycol linkage to the silica-polybutadiene, PEG was added in a 2 (PEG) to 3 (carboxylic group) ratio. Two separate batches of the sample were made and into each, PEG with two different molecular weights was added. They were O-(2-aminopropyl)-O'-(2-methoxyethyl) polypropylene glycol (PEG600) (Mn=600 Aldrich), and polyetheramine (PEG2000) (Jeffamine M-2070, Mn=2000, Huntsman). The mixture was left to mix for 24 hours and then left to dry at 70 C.

Vulcanization was performed at 150 C. For the accelerator, 2 phr of tetraethylthiuram disulfide (Acros Organics) was used. For the activator, 8 phr of zinc oxide (Aldrich Co.) was used. Also 3.2 phr of stearic acid (97%, Fluka Co.) and 12 phr of sulfur (Reagent grade, 100 mesh, Aldrich Co.) was used. For the NOHMS particles the fraction of PBD in the composite was used in calculating relative amounts of reactants for the vulcanization process as only the PBD would crosslink with the sulfur.

To grind the rubber material that was used as a control, liquid nitrogen and dry ice was used to make the rubber brittle and then was ground into powder. Carbon black (Super P-Li, TIMCAL Co.) was used as the conductivity aid, PVDF-HFP (Kynar 2801, Arkema Inc.) was used as the binder, and DMF (Aldrich) was used as the solvent. The NOHMS material, carbon black, and PVDF-HFP was mixed in 60:20:20 weight ratio. The slurry was left to mix for 24 hours and then placed on a copper disk. It was dried in an oven at 70 C for 4 hours and at 120 C under vacuum for 12 hours. Control samples were fabricated which included: (1) sulfur, and (2) 12 phr of sulfur vulcanized PBD as the active material. The cells with NOHMs as the active material also had 12 phr of sulfur. The cells were made with lithium (0.75 mm thick, 99.9%, Sigma Aldrich) at the anode. The electrolyte was 0.5M solution of lithium bis (trifluoromethane) sulfonimide (Aldrich), in a 50:50 weight ratio mixture of 1,3-dioxolane (Aldrich) and dimethoxyethane (Aldrich).

All references, including publications, patent applications, and patents cited herein are hereby incorporated by reference in their entireties to the extent allowable and to the same extent as if each reference was individually and specifically indicated to be incorporated by reference and was set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein is merely intended to serve as a shorthand method of referring individually to each separate value falling within the range, unless otherwise indicated herein, and each separate value is incorporated into the specification as if it was individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the embodiments without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

Therefore, the embodiments are illustrative of the invention rather than limiting of the invention. Revisions and modifications may be made to methods, materials, structures and dimensions of a nanoporous material, nanoparticle and a method for fabricating the nanoporous materials or nanoparticle in accordance with the embodiments while still providing a nanoporous material, a nanoparticle or a method for fabricating the nanoporous material or the nanoparticle in accordance with the invention, further in accordance with the accompanying claims.

What is claimed is:

1. A material comprising at least one nanoparticle comprising:
   a carbon material support comprising a hollow sphere shape mesoporous carbon material; and
   an elemental sulfur material supported on and within the carbon material support, wherein the material is an active material.

2. The material of claim 1 wherein:
   a cyclic voltammogram of a lithium-sulfur cell that includes the material within a cathode shows a stable reduction peak at about 2.4 volts over at least 10 cyclic voltammogram cycles;
   the cyclic voltammogram uses a lithium bis (trifluoromethane sulfone) imide in tetraglyme electrolyte;
   the cyclic voltammogram also shows a stable reduction peak at about 2.0 volts; and
   the cyclic voltammogram also shows a stable oxidation peak at about 2.35 volts and a stable oxidation peak at about 2.45 volts.

3. The material of claim 2 wherein the cyclic voltammogram shows a stable reduction peak at about 2.4 volts over at least 60 cyclic voltammogram cycles.

4. The material of claim 2 wherein the cyclic voltammogram shows a stable reduction peak at about 2.4 volts over at least 100 cyclic voltammogram cycles.

5. The material of claim 1 wherein the carbon material support comprises at least in-part a graphite carbon material.

6. The material of claim 1 wherein the elemental sulfur material comprises an amorphous sulfur material comprising up to about 70 percent by weight sulfur material.

7. The material of claim 1 wherein a cyclic voltammogram of a lithium-sulfur cell that includes the nanoparticle within a cathode shows a stable reduction peak at about 2.4 volts.

8. The material of claim 1 wherein a cyclic voltammogram of a lithium-sulfur cell that includes the active material within a cathode comprising a stable reduction peak of at least about 2.0 volts.

9. An electrode comprising:
   a conductive support; and
   a coating located upon the conductive support, the coating comprising an material comprising a nanoparticle comprising:
      a carbon material support comprising a hollow sphere shape mesoporous carbon material; and
      an elemental sulfur material supported on and within the carbon material support.

10. The electrode of claim 9 wherein a cyclic voltammogram of a lithium-sulfur cell that includes the material within the electrode shows a stable reduction peak at about 2.4 volts over at least 60 cyclic voltammogram cycles.

11. The electrode of claim 10 wherein the cyclic voltammogram of the electrode shows a stable reduction peak at about 2.4 volts over at least 100 cyclic voltammogram cycles.

12. The electrode of claim 9 wherein a cyclic voltammogram of a lithium-sulfur cell that includes the active material within a cathode shows a stable reduction peak at about 2.4 volts.

13. The electrode of claim 9 wherein a cyclic voltammogram of a lithium-sulfur cell that includes the active material within a cathode comprising a stable reduction peak of at least about 2.0 volts.

14. A battery comprising an electrode comprising:
a conductive support; and
a coating located upon the conductive support, the coating comprising an material comprising a nanoparticle comprising:
a carbon material support comprising a hollow sphere shape mesoporous carbon material; and
an elemental sulfur material supported on the carbon material support.

15. The battery of claim 14 wherein:
the electrode comprises a cathode; and
the battery comprises a lithium ion battery.

16. The battery of claim 14 wherein a cyclic voltammogram of a lithium-sulfur cell that includes the active material within the electrode shows a stable reduction peak at about 2.4 volts over at least 60 cyclic voltammogram cycles.

17. The battery of claim 16 wherein the cyclic voltammogram of the battery shows a stable reduction peak at about 2.4 volts over at least 100 cyclic voltammogram cycles.

18. The battery of claim 14 wherein a cyclic voltammogram of a lithium-sulfur cell that includes the active material within a cathode shows a stable reduction peak at about 2.4 volts.

19. The battery of claim 14 wherein a cyclic voltammogram of a lithium-sulfur cell that includes the active material within a cathode comprising a stable reduction peak of at least about 2.0 volts.

20. An active material comprising at least one nanoparticle consisting essentially of:
a carbon material support consisting essentially of a hollow shaped sphere mesoporous carbon material; and
an elemental sulfur material supported on and within the carbon material support.

21. The active material of claim 20 wherein a cyclic voltammogram of a lithium-sulfur cell that includes the nanoparticle within a cathode shows a stable reduction peak at about 2.4 volts.

* * * * *